United States Patent
Tatsuura et al.

(10) Patent No.: US 7,944,596 B2
(45) Date of Patent: May 17, 2011

(54) DISPLAY MEDIUM AND DISPLAY DEVICE

(75) Inventors: Satoshi Tatsuura, Kanagawa (JP);
Ryojiro Akashi, Kanagawa (JP);
Yoshinori Machida, Kanagawa (JP);
Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 13 days.

(21) Appl. No.: 12/432,176

(22) Filed: Apr. 29, 2009

(65) Prior Publication Data

US 2010/0142027 A1 Jun. 10, 2010

(30) Foreign Application Priority Data

Dec. 8, 2008 (JP) ................................ 2008-311773

(51) Int. Cl.
*G02F 1/153* (2006.01)
(52) U.S. Cl. ........................................ 359/268; 359/265
(58) Field of Classification Search .................... 359/268
See application file for complete search history.

(56) References Cited

U.S. PATENT DOCUMENTS

| | | | |
|---|---|---|---|
| 2007/0024948 A1 | 2/2007 | Hirano et al. | |
| 2008/0013152 A1 | 1/2008 | Hirano et al. | |

FOREIGN PATENT DOCUMENTS

| | | |
|---|---|---|
| JP | A-7-249790 | 9/1995 |
| JP | A-2003-255400 | 9/2003 |
| JP | A-2003-270670 | 9/2003 |
| JP | A-2004-151265 | 5/2004 |
| JP | A-2006-106669 | 4/2006 |
| JP | A-2006-113530 | 4/2006 |
| JP | A-2007-052171 | 3/2007 |
| JP | A-2008-180999 | 8/2008 |
| JP | A-2009-181058 | 8/2009 |

OTHER PUBLICATIONS

Japanese Office Action dated Jul. 13, 2010 for Japanese Patent Application No. 2008-311773 (with translation).

*Primary Examiner* — Ricky L Mack
*Assistant Examiner* — James C Jones
(74) *Attorney, Agent, or Firm* — Oliff & Berridge, PLC

(57) ABSTRACT

A display medium is provided. The display medium includes a pair of electrodes disposed so as to have a gap therebetween, an electrolyte disposed between the pair of electrodes, an electroconductive porous layer disposed at least one of the pair of electrodes at the side facing the other electrode, a first electrochromic dye held by the porous layer, a second electrochromic dye dispersed in the electrolyte and forming a color different from the color of the first electrochromic dye. Both the first electrochromic dye and the second electrochromic dye are oxidation dyes which form colors by an electrochemical oxidation reaction and are rendered color-faded by an electrochemical reduction reaction, or reduction dyes which form colors by an electrochemical reduction reaction and are rendered color-faded by an electrochemical reduction reaction. The threshold values of voltages applied to the pair of the electrodes for changing from a color-faded state to a colored state of the first electrochromic dye and the second electrochromic dye satisfy a specific relationship.

14 Claims, 9 Drawing Sheets

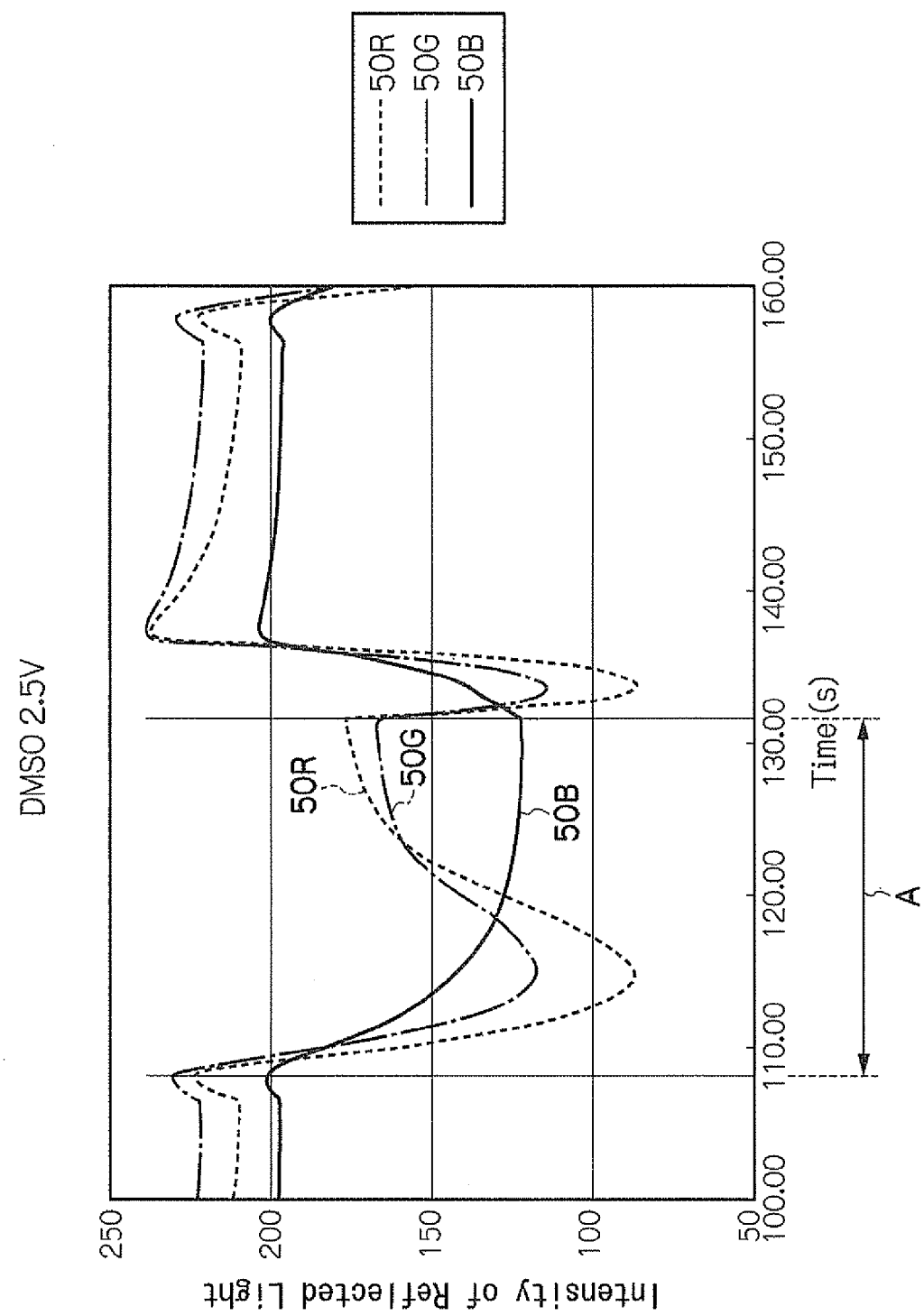

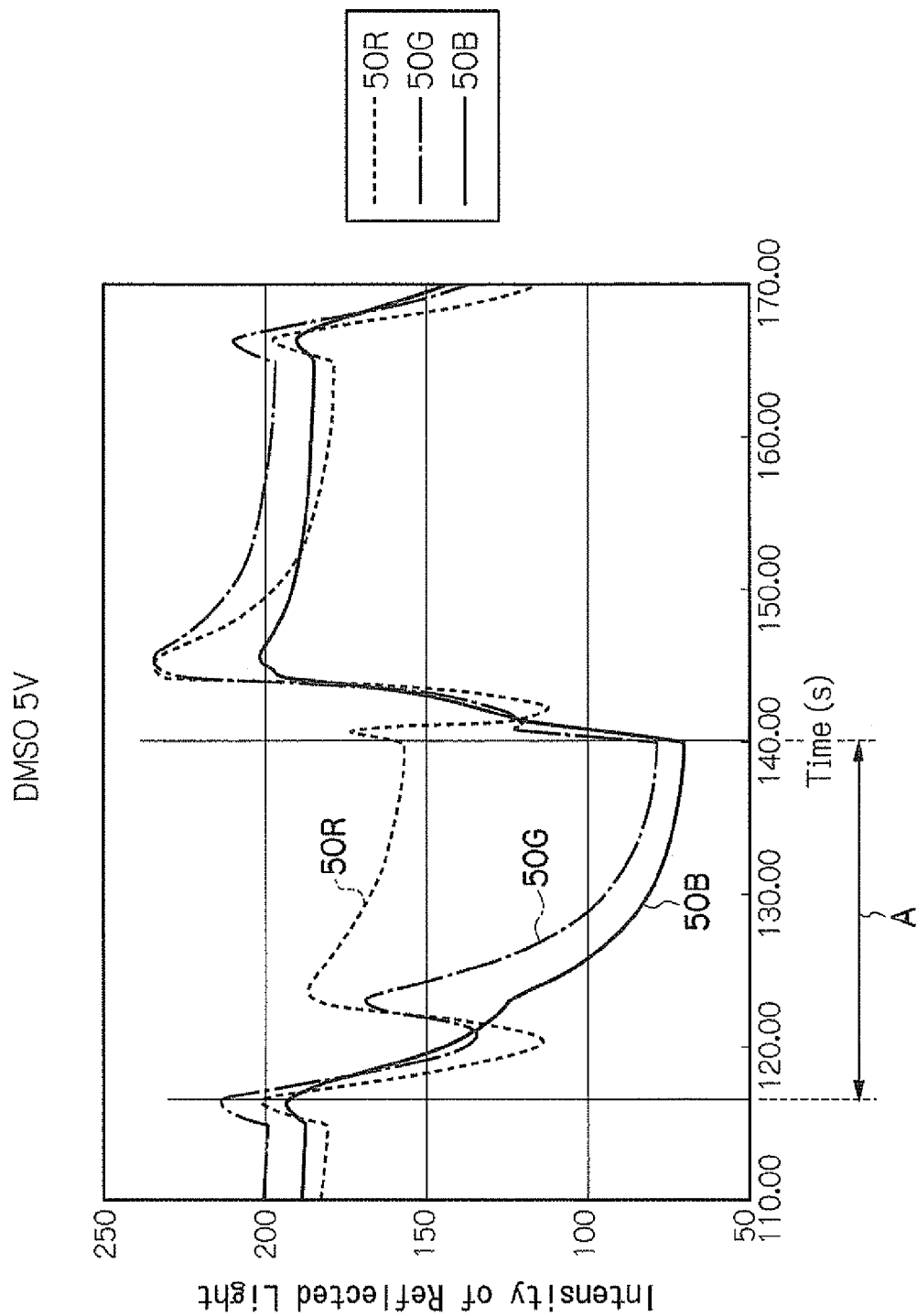

DISPLAY MEDIUM AND DISPLAY DEVICE

CROSS-REFERENCE TO RELATED APPLICATIONS

This application is based on and claims priority under 35 USC 119 from Japanese Patent Applications No. 2008-311773 filed Dec. 8, 2008.

BACKGROUND

1. Technical Field

The present invention relates to a display medium and a display device.

2. Related Art

A display medium is known that uses an electrochromic dye ("EC dye"), which reversibly changes a light absorption of a material due to an electrochemical redox reaction. This display medium may include a structure in which an EC dye-containing thin layer and an electrolyte liquid or an electrolyte layer are laminated, or a structure in which an EC dye is dissolved in an electrolyte liquid, between transparent electrodes. When a voltage is applied to the laminated EC dye-containing thin layer and the electrolyte layer via transparent electrodes, the entire surface of the EC dye-containing thin layer undergoes a reversible coloring or color-fading reaction due to the electrochemical redox reaction.

In the display medium using an EC dye, a clear display substantially independent of a viewing angle even under strong outdoor light can be obtained because the image display has a low drive voltage, an excellent image retentivity and is light-absorptive. For this reason, the display medium using an EC dye has excellent characteristics as a glare-resistant mirror for automobiles and light-control glass. Further, the display medium using an EC dye does not require a polarizing plate, and has excellent visibility since the display medium is light-receiving and does not depend on a viewing angle. The display medium using an EC dye also has a simple structure, so it is easy to increase its size. Furthermore, a variety of color tones can be obtained by appropriately selecting EC dye-containing thin layers, and a static display can be achieved simply by interrupting the movement of electrons to maintain a redox state. Moreover, in the display medium using an EC dye, electrical power is not required to maintain the display in a static state, which confers various advantages such as lower power consumption.

SUMMARY

According to an aspect of invention, a display medium is provided. The display medium of the first aspect of the invention includes: a pair of electrodes disposed with a gap therebetween; an electrolyte disposed between the pair of electrodes; an electroconductive porous layer disposed at least one of the pair of electrodes, at the side facing the other electrode; a first electrochromic dye held by the porous layer; a second electrochromic dye dispersed in the electrolyte and forming a color different from the color of the first electrochromic dye; wherein both the first electrochromic dye and the second electrochromic dye are oxidation dyes (oxidation dyes) which form colors by an electrochemical oxidation reaction and are rendered color-faded by an electrochemical reduction reaction, or reduction dyes (reduction type dyes) which form colors by an electrochemical reduction reaction and are rendered color-faded by an electrochemical reduction reaction, and the threshold values of respective voltages applied to the pair of the electrodes to change each of the first electrochromic dye and the second electrochromic dye from a color-faded state to a colored state satisfy the relationship represented by the following Formula (1).

$$E1 < E2 \qquad \text{Formula (1)}$$

In Formula (1), E1 represents the absolute value of the threshold value of the voltage applied to the pair of the electrodes to change the first electrochromic dye from a color-faded state to a colored state, and E2 represents the absolute value of the threshold value of the voltage applied to the pair of the electrodes to change the second electrochromic dye from a color-faded state to a colored state.

BRIEF DESCRIPTION OF THE DRAWINGS

Exemplary embodiments of the present invention will be described in detail based on the following figures, wherein:

FIG. 11 is a diagrammatic drawing showing the measurement result of the reflective intensity of the display medium in Example 1; and FIG. 12 is a diagrammatic drawing showing the measurement result of the reflective intensity of the display medium in Example 1.

DETAILED DESCRIPTION OF THE INVENTION

Hereinafter, exemplary embodiments of the invention will be described with reference to the drawings. The same denotations are assigned to the members having the same actions and functions through the all drawings, and explanations thereof may be omitted.

Figure 1:
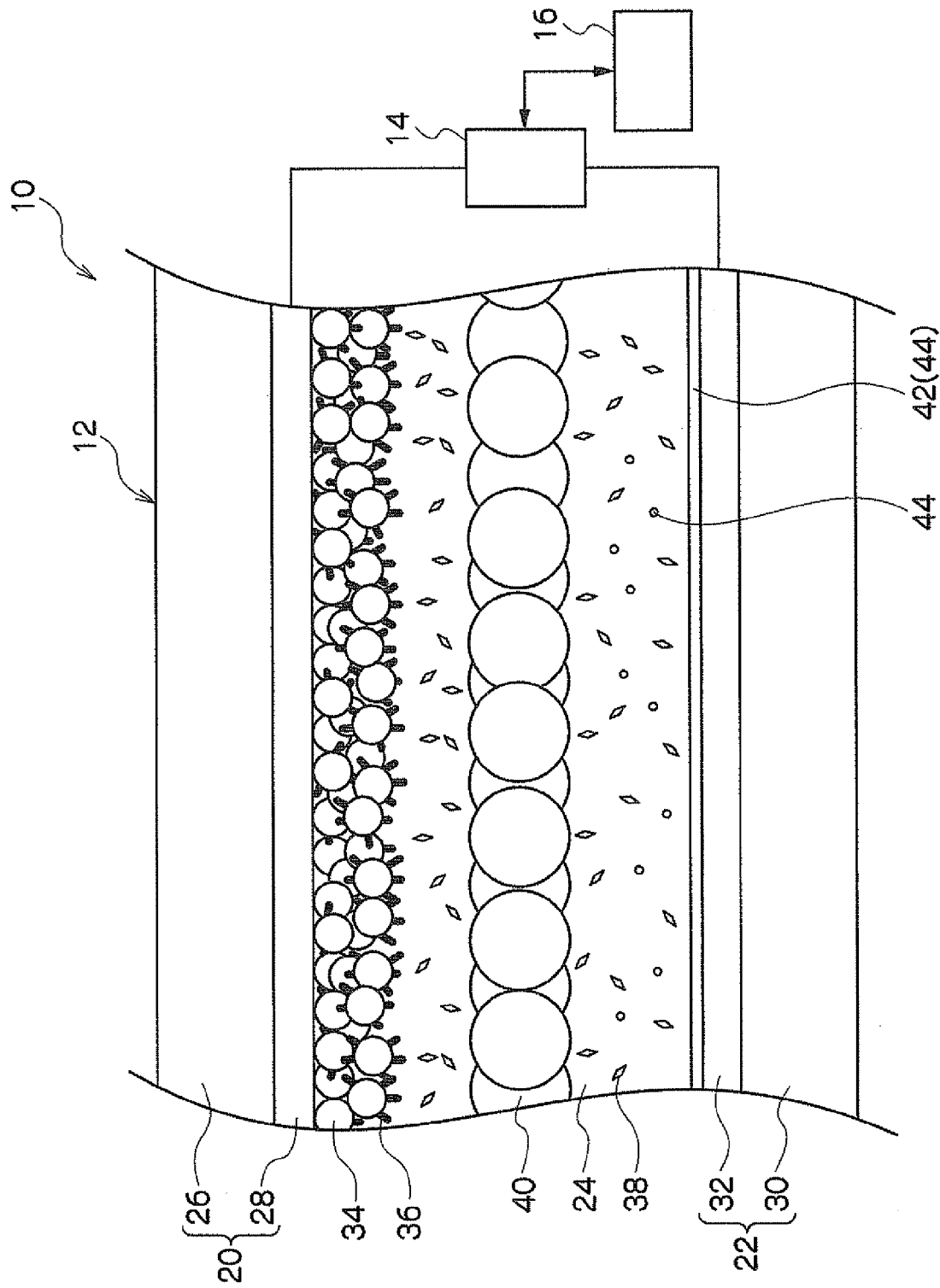
FIG. 1 is a schematic drawing illustrating a display device according to an exemplary embodiment of the invention.

In an exemplary embodiment, as shown in FIG. 1, a display device 10 includes a display medium 12, a voltage applying section 14 that applies a voltage to the display medium 12, and a control section 16.

In FIG. 1, the display medium 12 includes a display substrate 20 which is an image display screen, a back substrate 22 opposite the display substrate 20 with a gap therebetween, and an electrolyte layer 24 which is provided between the display substrate 20 and the back substrate 22. Further, between the display substrate 20 and the back substrate 22, an electroconductive or semiconductive porous layer 34 is disposed at least on the display substrate 20 at the side which faces the back substrate 22. Furthermore, a reflective layer 40 is disposed between the display substrate 20 and the back substrate 22.

Here, in exemplary embodiments, the terms "electroconductivity" and "electroconductive" mean that the volume resistivity is less than $10^2$ Ω·cm. Further, in the following description, the terms "semiconductivity" and "semiconductive" mean that the volume resistivity is from $10^2$ Ω·cm to $10^5$ Ω·cm.

A first electrochromic dye (hereafter, may be referred to as an EC1 dye) 36 is held as an electrochromic dye (hereafter, may be referred to as an EC dye) by the porous layer 34. Further, a second electrochromic dye (hereafter, may be referred to as an EC2 dye) 38 is dispersed as an electrochromic dye in the electrolyte layer 24.

The electrochromic dye is a dye which is colored or is rendered color-faded by at least one of an electrochemical oxidation reaction and an electrochemical reduction reaction, and details of the electrochromic dye will be described below. In the display medium 12 according to an exemplary embodiment, at least two kinds of electrochromic dyes which form colors different from each other are contained between the display substrate 20 and the back substrate 22, and one (EC1 dye 36 in an exemplary embodiment) of the electrochromic dyes is held by the porous layer 34, and the other electrochromic dye (EC2 dye 38 in an exemplary embodiment) is dispersed in the electrolyte layer 24.

Both the EC1 dye 36 held by the porous layers 34 and the EC2 dye 38 dispersed in the electrolyte layer 24 are an oxidation dye, or a reduction dyes. When the EC1 dye 36 is the oxidation dye, the EC2 dye 38 is also the oxidation dye, and when the EC1 dye 36 is the reduction dye, the EC2 dye 38 is also the reduction dye.

The oxidation dye is an EC dye, the colors of which are faded to attain a color-faded state by an electrochemical reduction reaction, and which is colored to attain a colored state by an oxidation reaction. The reduction dye is an EC dye, the colors of which are faded to attain a color-faded state by an electrochemical oxidation reaction, and which is colored to attain a colored state by a reduction reaction.

A "colored state" refers to a state of being colored, and is defined as a state in which at least an absorption peak is present at least in the visible light region, and is a state in which coloration is visually observed. Further, a "color-faded state" refers to a state of being color-faded, and is defined as a state in which at least an absorption peak is present outside the visible light region, and is a state in which a lack of color, or a faint color, is visually observed.

Furthermore, with respect to the EC1 dye 36 held by the porous layer 34 and the EC2 dye 38 dispersed in the electrolyte layer 24, the threshold values of the respective voltages applied between the electrode 28 and the electrode 32 to change each of the EC1 dye 36 and the EC2 dye 38 from a color-faded state to a colored state satisfy the relationship of the following Formula (1):

$$E1 < E2 \quad \text{Formula (1)}$$

In Formula (1), E1 represents the absolute value of the threshold value of the voltage applied between the electrode 28 and the electrode 32 to change the EC1 dye held by the porous layer 34 from a color-faded state to a colored state, and E2 represents the absolute value of the threshold value of the voltage applied between the electrodes to change the EC2 dye held by the porous layer 38 dispersed in the electrolyte layer 24 from a color-faded state to a colored state.

In the display medium 12 of an exemplary embodiment, the relationship of the threshold values of the EC1 dye 36 and the EC2 dye 38 satisfies the relationship of Formula (1), and the EC1 dye 36 is held by the porous layer 34, and the EC2 dye 38 is dispersed in the electrolyte layer 24. Accordingly, by a redox reaction due to electron transfer between the molecules of the EC1 dye 36 and the EC2 dye 38, one of the EC1 dye 36 or the EC2 dye 38 attains the colored state, while the other attains the color-faded state. Consequently, it is possible to prevent the state in which both of the EC1 dye 36 and the EC2 dye 38 are in the colored state simultaneously from occurring, so that the color mixing among the dyes can also be prevented. Therefore, the specific electrochromic dye contained in the display medium can be effectively colored selectively. Details of specific action and specific electrochromic dyes will be described below.

—Display Substrate and Back Substrate—

A display substrate 20 has a structure in which the electrode 28 is disposed on the support substrate 26. The back substrate 22 has a structure in which the electrode 32 is disposed on a support substrate 30. Of the display substrate 20 and the back substrate 22, at least the display substrate 20 is transparent. In the exemplary embodiment, the light-transmitting property and transparency mean that the average transmittance of the visible light is 80% or more.

The support substrate 26 and the support substrate 30, on which the electrode 28 and the electrode 32 are provided, respectively, are used as substrate members for disposing the electrode 28 and the electrode 32 respectively, and the material, shape, configuration and size thereof may be suitably designed without specific limitation.

Examples of these support substrate 26 and support substrate 30 include a glass plate and a polymer film and the like. Examples of the polymer film include tetraacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin and bromated phenoxy.

Materials for the electrode 28 and the electrode 32 are not specifically limited as long as the materials are transparent and electroconductive, and can be appropriately selected in accordance with the intended use. Examples of such materials include indium tin oxide (ITO), tin oxide (NESA), fluorine-doped tin oxide (FTO), indium oxide, zinc oxide, platinum, gold, silver, rhodium, copper, chromium and carbon. Among them, metal oxides represented by tin oxide-indium oxide (ITO), tin oxide and zinc oxide can be preferably used. Furthermore, fluorine-doped tin oxide (FTO) and indium tin oxide (ITO) are preferable from the viewpoint of a low surface resistivity, a high heat resistance and a high light-transmittance.

In the display medium 12 of an exemplary embodiment, the electroconductive or semiconductive porous layer 34 are disposed in the state in contact with the electrode 28, and it is required that the electrode is chemically stable even when the electrode comes into contact with the porous layer 34. To this end, fluorine-doped tin oxide (FTO) and indium tin oxide (ITO) are suitable.

The thickness of the electrodes 28 and the electrode 32 is not specifically restricted, but is suitably selected in accordance with the intended use, and, for example, is generally 0.1 μm or more, and more specifically from 0.1 μm to 20 μm.

The electrode 28 and the electrode 32 are formed by a sputtering method, a sol gel method and a printing method. Further, in the display medium 12, as the farthest electrode (electrode 32 of an exemplary embodiment) in the viewing direction, a layer of an electroconductive polymer, carbon, or a metal such as aluminum, gold, silver, nickel or platinum may be used in addition to the metal oxide layer represented by tin oxide-indium oxide (ITO), tin oxide and zinc oxide.

—Porous Layer—

The porous layer 34 is disposed so as to be in contact with the electrode 28, and is electroconductive. Herein, an exemplary embodiment is described in which the porous layer 34 is disposed to contact the electrode 28 which is provided at the display substrate side. However, the porous layer 34 may be disposed on both of the electrode 28 and the electrode 32, such that one porous layer 34 is disposed in contact with the electrode 28 at the side of the electrode 28 which faces the electrode 32, and the other porous layer 34 is disposed in contact with the electrode 32 at the side of the electrode 32 which faces the electrode 28.

The porous layer 34 has a porous structure so that the porous layer has a number of fine pores capable of carrying the EC 1 dye 36 on the surface and in the inside of the porous layer 34. The porous layer 34 may be a single layered structure, but may be a multiple layered structure.

The specific surface area of the porous layer 34 is preferably from 1 $m^2/g$ to 5,000 $m^2/g$, and more preferably from 10 $m^2/g$ to 2,500 $m^2/g$. Here, the specific surface area means the BET specific surface area determined by the amount of adsorption of nitrogen gas. When the specific surface area is too small, the amount of adsorption of the EC1 dye 36 becomes insufficient, and may result in that the object of the invention cannot be achieved.

The thickness (the overall thickness in the case of a multiple layered structure) of the porous layer 34 is preferably from 1 μm to 200 μm, and is more preferably from 5 μm to 50 μm. When the thickness is less than 1 μm, the display performance may be deteriorated due to a decrease in the amount of the EC dye to be adsorbed, and when the thickness is more than 200 μm, the transparency may be lowered and the drive voltage may become higher.

Although the porous layer 34 may have any structure, it is desirable that a porous state is formed by filling the layer with conductive particles in view of the simplicity of manufacture. The conductive particles contained in the porous layer 34 are not specifically restricted and are selected in accordance with the intended use. Examples of the conductive particles include particles of a single semiconductor substance, an oxide semiconductor, a compound semiconductor, an organic semiconductor, a complex oxide semiconductor, and the mixture thereof, and may contain an impurity as a dopant. In addition, the morphology of the crystal of the semiconductors is not specifically restricted, and may be monocrystalline, polycrystalline, amorphous, or the mixture thereof.

Examples of the single semiconductor substance include silicon (Si), germanium (Ge) and tellurium (Te).

The oxide semiconductor is a metal oxide having characteristic as a semiconductor. Examples of the oxide semiconductors include $TiO_2$, $SnO_2$, $Fe_2O_3$, $SrTiO_3$, $WO_3$, $ZnO$, $ZrO_2$, $Ta_2O_5$, $Nb_2O_5$, $V_2O_5$, $In_2O_3$, $CdO$, $MnO$, $CoO$, $TiSrO_3$, $KTiO_3$, $Cu_2O$, sodium titanate, barium titanate and potassium niobate.

Examples of the compound semiconductors include sulfide of cadmium, sulfide of zinc, sulfide of lead, sulfide of silver, sulfide of antimony, sulfide of bismuth, selenide of cadmium, selenide of lead, telluride of cadmium, phosphide of zinc, phosphide of gallium, phosphide of indium, phosphide of cadmium, selenide of gallium-arsenic, selenide of copper-indium, and sulfide of copper-indium.

Examples of the organic semiconductors include polythiophene, polypyrrole, polyacethylene, polyphenylene vinytene and polyphenylene sulfide.

Examples of the complex oxide semiconductors includes $SnO_2$—$ZnO$, $Nb_2O_5$—$SrTiO_3$, $Nb_2O_5$—$Ta_2O_5$, $Nb_2O_5$—$ZrO_2$, $Nb_2O_5$—$TiO_2$, Ti—$SnO_2$, Zr—$SnO_2$, Bi—$SnO_2$, In—$SnO_2$, Al—$ZnO$ and Ga—$ZnO$. The $SnO_2$—$ZnO$ is formed by covering the periphery of ZnO particles having a relatively large size (particle size of about 0.2 μm) with $SnO_2$ ultra fine particles (particle size of about 15 nm), and the ratio of the both components of the complex, for example, $SnO_2$:ZnO may be from 70:30 to 30:70 by weight. $Nb_2O_5$ complexes such as $Nb_2O_5$—$SrTiO_3$, $Nb_2O_5$—$Ta_2O_5$, $Nb_2O_5$—$ZrO_2$ and $Nb_2O_5$—$TiO_2$, are complexed with $Nb_2O_5$ at a ratio of, for example, from 8:2 to 2:8 by weight.

The shape of the semiconductor particles is not specifically restricted, but may be appropriately selected in accordance with the intended use, and may be any of spherical, nanotubed, rod and whisker shapes, and may be a mixture of two or more kinds of particles having different shapes. In the case of the spherical particles, the number average particle size is preferably in the range of from 0.1 nm to 1,000 nm, and more preferably in the range of from 1 nm to 100 nm. Two or more kinds of particles having different particle size distribution one another may be mixed. Further, in the case of the rod-shaped particles, the particles preferably have an aspect ratio of from 2 to 50,000, and more preferably 5 to 25,000.

The method of forming the porous layer is not specifically restricted, and may be suitably selected in accordance with the kind of semiconductors. Examples of the methods include a metal anodizing method, a cathode deposition method, a screen printing method, a squeegee method, a sol-gel method, a thermal oxidation method, a vacuum deposition method, a DC and FC sputtering method, a chemical vapor deposition method, an organic metal chemical vapor deposition method, a molecular beam deposition method, a laser ablation method, and the combination of these methods may be used.

The methods of forming porous layer as recited in JP-A No. 2003-255400 may be used as a concrete forming method.

—Electrolyte Layer—

The electrolyte layer 24 may have any form in which an EC2 dye 38 is dispersed, and the dispersed EC2 dye 38 is movable between the display substrate 20 and the back substrate 22, and may be any of a liquid form and a gel form. The electrolyte layer 24 may be a solid as long as the dispersed EC2 dye 38 is movable in the electrolyte layer 24.

When the electrolyte layer 24 is a liquid, it is preferable to use the electrolyte layer 24 formed by dissolving a charge transport material such as an electrolyte in a solvent, which can transport the charge at a sufficient velocity between the display substrate 20 and the back substrate 22.

Examples of the electrolytes include perchlorates such as lithium perchlorate, sodium perchlorate, potassium perchlorate and tetrabutyl ammonium perchlorate; iodine, bromine; metal halides such as LiI, NaI, KI, CsI, $CaI_2$, LiBr, NaBr, KBr, CsBr and $CaBr_2$; halides of ammonium compounds such as tetraethylammonium iodide, tetrapropylammonium iodide, tetrabutylammonium iodide, tetramethylammonium bromide, tetraethylammonium bromide and tetrabutylammonium bromide; alkyl viologens such as methyl viologen chloride and hexyl viologen bromide; polyhydroxy benzenes such as hydroquinone and naphthohydroquinone; and iron complexes such as ferrocene and ferrocyanic acid salt; and at least one kind of these electrolytes may be used, but is not limited thereto. Further, when plural electrolytes such as the combination of iodine and lithium iodide, which generate a redox pair (oxidation-reduction pair), are mixed beforehand and is used, the performance, in particular, current characteristics of the display medium 12 can be improved. Among them, a combination of iodine and an ammonium compound, and iodine and metal iodide may be suitably exemplified.

Examples of solvents for dissolving these electrolytes include carbonate compounds such as ethylene carbonate and propylene carbonate; ethers such as dioxane, diethyl ether and an ethyleneglycol dialkylether; alcohols such as methanol, ethanol, isopropyl alcohol, ethylene glycol, propylene glycol and polyethylene glycol; nitrites such as acetonitrile and benzonitrile; aprotic polar solvents such as dimethylformamide, dimethyl sulfoxide, N-methylpyrrolidone, propylene carbonate and ethylene carbonate; and water, but are not limited thereto.

The concentration of the electrolyte in the above solvents is preferably from 0.001 mole/l to 2 mole/l, and more preferably from 0.01 mole/l to 1 mole/l. When the concentration of the electrolyte is less than 0.001 mole/l, the performance may be deteriorated due to insufficient function of the electrolyte as a carrier. On the other hand, when the concentration of the electrolyte exceeds 2 mole/l, the effect corresponding to the concentration may not be exerted, and the viscosity of the electrolyte liquid may become higher, and this may result in reduction in current.

When the electrolyte layer 24 is a gel, a polymer, an oil gelling agent or polyfunctional monomers is added to and mixed with the electrolyte and the solvent. When the gelation is caused by adding a polymer, the compounds recited in "Polymer Electrolyte Reviews-1 and 2" (co-edited by J. R. MacCallum and C. A. Vincent, ELSEVIER APPLIED SCIENCE), may be used, and in particular, polyacrylonitrile and polyvinylidene fluoride are suitable. When the gelation is caused by adding an oil gelling agent, the compounds recited in "J. Chem. Soc. Japan, Ind. Chem. Sec., 46, 779 (1943)", "J. Am. Chem. Soc., 111, 5542 (1989)", J. Chem. Soc., Chem. Commun., 1993, 390", "Angew. Chem. Int. Ed. Engl., 35, 1949 (1996)", "Chem. Lett., 1996, 885" and "J. Chem. Soc., Chem. Commun., 1997, 545" may be used, and in particular, compounds having an amide structure in the molecular structure are desirable.

As the electrolyte layer 24, a solid electrolyte layer formed in a film-shape by polymerizing a mixed solution of a matrix material and a supporting electrolyte may be used.

Examples of the supporting electrolyte include inorganic electrolytes and organic electrolyte, and may be selected in accordance with the intended use without limitation. The supporting electrolyte may be used singly, or two or more kinds thereof may be used in combination, the supporting electrolyte may be a commercial product, or may be suitably synthesized.

Examples of the inorganic electrolytes include an inorganic acid anion-alkali metal salt, an alkali metal salt and an alkaline earth metal, and among them, the inorganic acid anion-alkali metal salt is preferable, and an inorganic acid lithium salt is more preferable.

Examples of the inorganic acid anion-alkali metal salts include $XAsF_6$, $XPF_6$, $XBF_4$, $XClO_4$ (here, X represents H, Li, K or Na.), and more specifically, lithium perchlorate is suitable.

Examples of the alkali metal salts include LiI, KI, $LiCF_3SO_3$, $LiPF_6$, $LiClO_4$, $LiBF_4$, LiSCN, $LiAsF_6$, $NaCF_3SO_3$, $NaPF_6$, $NaClO_4$, NaI, $NaBF_4$, $NaAsF_6$, $KCF_6SO_3$ and $KPF_6$. Examples of the organic electrolytes include an organic acid anion-alkali metal salt, a quaternary ammonium salt, an anionic surfactant and an imidazolium salt, and among them, an organic acid anion-alkali metal salt is desirable, and an organic acid lithium salt is more desirable.

As the use amount of the matrix material in the electrolyte layer, the ratio of the matrix material to the supporting electrolyte (matrix material: supporting electrolyte) by molar ratio is preferably in the range of from 70:30 to 5:95, more preferably in the range of from 50:50 to 10:90, and still more preferably in the range of from 50:50 to 20:80. Here, the molar ratio means the ratio of the molar quantity of the matrix material to the molar quantity of the ion of the supporting electrolyte. The molar quantity of the matrix material means a molar quantity in terms of one molecule equivalent to the monomer unit of the polymer compound.

Such an electrolyte layer 24 of a film-like solid can be prepared in such a manner that a small amount of a polymerization initiator such as benzoyl peroxide and azobisisobutylonitrile is added to the mixed solution of the matrix material and the supporting electrolyte, and the resultant product is extended in a thin layer, followed by polymerizing thereof by heating, or a photopolymerization initiator such as IRGACURE ((trade name) manufactured by Ciba) is added to the mixed solution, and the resultant mixture is polymerized by being irradiated with ultraviolet ray. In addition, the thickness of the film is generally from 30 μm to 500 μm, and preferably from 50 μm to 200 μm.

—Reflective Layer—

The reflective layer 40 is provided between the display substrate 20 and the back substrate 22, and has an optical reflective property which is different from the color of the colored state of the EC dyes (EC1 dye 36 and EC2 dye 38 in an exemplary embodiment) contained between the display substrate 20 and the back substrate 22.

The reflective layer 40 is configured so that the movement of the EC2 dye 38 dispersed in the electrolyte layer 24 in the direction of the display substrate 20 and the back substrate 22, which face each other, is not hindered.

In addition, as described above, the reflective layer 40 "has an optical reflective property which is different from the color of the colored state of the EC dyes", and this means that when the EC1 dye 36 and the EC2 dye 38 enclosed in the display medium 12, and the reflective layer 40 are compared with one another while the EC dyes being colored and visually observed, the difference between the EC1 dye 36 and the reflective layer 40, and the difference between the EC2 dye 38 and the reflective layer 40 can be distinguishable in color hue, lightness and vividness.

The reflective layer 40 may have a function for shielding the color at the back substrate 22 side from the reflective layer 40. Here, "shielding" in the present exemplary embodiment means the case where the light transmittance to the visible light is 50% or less.

Accordingly, the color in the colored state of the EC dye at the display substrate 20 side from the reflective layer 40 is displayed on the display medium 12.

The color of the reflective layer 40 is desirably white from the viewpoint that the display can be made with a white background, and the brightness is preferably 30% or more, and more preferably 40% or more. The brightness refers to a measure of whiteness, and more specifically a value measured by a Hunter-type brightness meter or an X-rite colorimeter in accordance with the method recited in JIS-P8123, the disclosure of which is incorporated by reference herein.

The configuration of the reflective layer 40 is not specifically limited as long as the reflective layer 40 has the above characteristics, and may be an aggregate of particulate members such as inorganic material particles formed from titanium oxide and zinc oxide, and organic material particles formed from methylmethacrylate resin, styrene acrylate resin, silicone resin and tetrafluoroethylene resin, or may be a configuration in which these particles are dispersed in the electrolyte layer 24, or may be a resin sheet or nonwoven sheet.

For example, an inkjet method or the like is used to enclose the reflective layer 40 between the substrates. Further, for fixing the reflective layer 40 between the substrates, for example, after enclosing the reflective layer 40, the substrates and the reflective layer may be heated (and with pressurizing, if necessary), and the surface layer of the particles which are components of the reflective layer 40 is molten while maintaining inter-particle gaps, so that the reflective layer 40 may be fixed.

—Electrochromic Dye—

Next, the electrochromic dye is explained.

In the display medium 12 of an exemplary embodiment, as described in the above, at least two kinds of the electrochromic dyes (EC dyes) are contained between the display substrate 20 and the back substrate 22, one of the electrochromic dyes (the EC1 dye 36 in an exemplary embodiment) is held by the porous layer 34, and the other electrochromic dye (the EC2 dye 38 in an exemplary embodiment) is dispersed in the electrolyte layer 24. Further, with respect to the EC1 dye 36 held by the porous layer 34, and the EC2 dye 38 dispersed in the electrolyte layer 24, the threshold values of the voltages applied between the electrode 28 and the electrode 32 for changing from the color-faded state to the colored state satisfies the relationship of the above Formula (1).

The EC dyes used for the display medium 12 of an exemplary embodiment are not specifically restricted as long as the dyes have an action such that the dyes are colored or are rendered color-faded due to at least one of the electrochemical oxidation reaction and the electrochemical reduction reaction, and the dyes can be appropriately selected in accordance with the intended use within the scope satisfying the above conditions (in the case of the EC1 dye 36 and the EC2 dye 38, Formula (1) is satisfied, and both the dyes are the oxidation dyes or the reduction dyes and are colored in different colors), and for example, organic compounds, metal complexes and the like may be used as the EC dyes. These compounds may be used singly, or two or more kinds may be used in combination.

Examples of the metal complexes include Prussian blue, a metal-bipyridyl complex, a metal phenanthroline complex, a metal-phthalocyanine complex, meta-ferricyanide and the derivatives, thereof. Examples of the organic materials include (1) pyridine compounds, (2) electroconductive polymers, (3) styryl compounds, (4) donor/acceptor type compounds and (5) other organic dyes.

Examples of the above (1) pyridine compounds include viologens, heptyl viologens (diheptyl viologen dibromide and the like), methylene bispyridinium, phenanthroline, azobipyridinium, a 2,2-biprydinium complex, quinoline, isoquinoline and the like.

Examples of the above (2) electroconductive polymers include a polypyrrole, a polythiophene, a polyaniline, a polyphenylene diamine, a polyaminophenol, a polyvinyl carbazole, a polymer viologen polyion complex, TTF and the derivatives thereof.

Examples of the above (3) stryryl compounds include 2-[2-[4-(dimethylamino)phenyl]ethenyl]-3,3-dimethylindolino[2,1-b]oxazolizine, 2-[4-[4-(dimethylamino) phenyl]-1,3-butadienyl]-3,3-dimethylindoliono[2,1-b]oxazolizine, 2-[2-[4-(dimethylamino) phenyl]ethenyl]-3,3]dimethyl-5-methylsulfonylindolino[2,1-b]oxazolizine, 2-t4-[4-(dimethylamino) phenyl]1,3-butadienyl]-3,3-dimethyl-5-sulfonylindoliono[2,1-b]oxazolizine, 3,3-dimethyl-2-[2-(9-ethyl-3-carbazolyl)ethenyl]indolino[2,1-b]oxazolizine and 2-[2-[4-(acetylamino)phenyl]ethenyl]-3,3-dimethylindoliono[2,1-b]oxazolozine.

Examples of the above (4) donor/acceptor type compounds include tetracyano quinodimethane and tetrathiafulvalene.

Examples of the above (5) other organic dyes include phthalic acid, a carbazole, methoxybiphenyl, anthraquinone, quinone, diphenylamine, aminophenol, tris-aminophenylamine, phenylacetylene, a cyclopentyl compound, a benzodithiolium compound, a squarium salt, a cyanine, a rare earth phthalocyanine complex, ruthenium diphthalocyanine, a merocyanine, a phenanthroline complex, pyrazoline, a redox indicator, a pH indicator, and the derivatives thereof.

Among these compounds, viologen-based dyes and phthalic acid-based dyes are suitable.

In the display medium 12 of an exemplary embodiment, as the EC dyes, reduction type color-forming dyes which attain a color-faded state of a lack of color or a faint color in the oxidized state, and are colored to attain a colored state in the reduced state, and oxidation type color-forming dyes which attain a color-faded state of a lack of color or a faint color in the reduced state, and are colored to attain a colored state in the oxidized state, can be used. These dyes may be selected in accordance with the intended use.

Furthermore, a multicolor-forming dye which forms several kinds of colors in the colored state according to the degree of reduction or oxidation may be used, and may be selected in accordance with the intended use.

As described in the above, of the two kinds of the EC dyes contained between the electrodes of the display medium 12, the EC1 dye 36, which has a smaller absolute value of the threshold value of the voltage applied between the electrode 28 and the electrode 32 for changing the color from the color-faded state to the colored state, is held by the porous layer 34. The term "held" means the state where the EC dye is held on the surface of the porous layer 34, and held in pores of the porous layer 34. As methods of holding the EC dye in the porous layer 34, conventionally known techniques such as a method of adsorbing the EC1 dye 36 to the surface of the porous layer 34, and a method of chemically bonding the EC1 dye 36 to the porous layer 34 may be used.

For example, methods such as a dry process such as a vacuum deposition method, a coating method such as a spin coating, an electric field deposition method, an electric field polymerization method and a natural adsorption process by being immersed in a solution containing a compound to be held, may be appropriately selected. Among these methods, the natural adsorption process is preferable from the viewpoint of many advantages such that functional molecules are surely held in the microscopic pores in the metal oxide layer to every corners uniformly, and specific devices are not required, and further, the compound is not excessively adsorbed beyond necessity since the quantity of the compound to be adsorbed is almost equal to the quantity for forming a monolayer of the compound in most cases.

Moreover, the method of chemical bonding the EC1 dye 36 to surface of the porous layer 34 may also be suitably used.

As the natural adsorption process, a method of immersing a transparent substrate having a well dried porous layer 34 into a solution of an EC dye to be held, or a method of coating a solution of an EC dye to be held to the porous layer 34, can be used. In the former case, an immersing method, a dip method, a roller method and an air knife method may be used. In the case of the immersing method, a dye may be adsorbed at room temperature, or with heating under reflux as recited in JP-A No. 7-249790. Examples of the latter coating method include a wire bar method, a slide hopper method, an extrusion method, a curtain method, a spin method and a spray method.

Examples of the solvents for dissolving the EC dye used for the solution of the EC dye include water and alcohols (methanol, ethanol, t-butanol and benzyl alcohol), nitrites (acetonitrile, propionitril and 3-methoxypropionitril), nitromethane, halogenated hydrocarbons (dichloromethane, dichloroethane, chloroform and chlorobenzene), ethers (diethyl ether and tetrahydrofuran), dimethyl sulfoxide, amides (N,N-dimethylformamide and N,N-dimethylacetamide), N-methylpyrrolidone and 1,3-dimethylimidazolizinone, 3-methyloxazolizinone, esters (ethyl acetate and butyl acetate), carbonate esters (diethyl carbonate, ethylene carbonate and propylene carbonate), ketones (acetone, 2-butanone and cyclohexanone), hydrocarbons (hexane, petroleum ether, benzene and toluene), and the mixed solvents thereof.

In a method of chemically bonding the EC dye (EC1 dye 36) to the surface of the porous layer 34, a predetermined functional group may be interposed between the skeleton of the EC dye and the surface of the porous layer 34. As the functional groups, for example, functional groups such as an alkyl group, a phenyl group, ester, and amide are suitable. Alternatively, the surface of the porous layer 34 may be modified with a silane coupling agent and the like, and then the EC dye may be chemically bonded to the modified surface.

The adsorption amount of the EC dye (EC1 dye 36) is preferably from 0.01 mmol to 100 mmol per unit surface area (1 $m^2$) of the porous layer 34. Further, the adsorption amount of the EC1 dye 36 to the semiconductor particles of the porous layer 34 is desirably in the range of from 0.01 mmol to 100 mmol per 1 g of the semiconductor particles.

Further, when two or more kinds of the EC dyes which form colors different from one another are adsorbed to the porous layer 34, the total amount of the EC dyes to be adsorbed to the porous layer 34 may be in the above range. Details thereof will be described below.

The porous layer 34 is preferably subjected to a heat treatment (for example, at a temperature of from 100° C. to 550° C. for 10 minutes) before the EC dye (EC1 dye 36) is held by the porous layer. By this treatment, moisture and other impurities adsorbed by the surface of the porous layer 34 can be removed, and the surface of the porous layer 34 can be activated so that and the EC dye can be efficiently adsorbed.

Meanwhile, of the two kinds of the EC dyes contained between the substrates of the display medium 12, the EC2 dye 38, which has a higher absolute value of the threshold value of the voltage applied between the electrode 28 and the electrode 32 for changing the color from the color-faded state to the colored state, is dispersed in the electrolyte layer 24. The concentration of the EC dye (EC2 dye 38) in an electrolyte dispersed in the electrolyte layer 24 is preferably from 0.001 mole/l to 2 mole/l, and more preferably from 0.01 mole/l to 1 mole/l.

Further, when two or more kinds of the EC dyes which form colors different from one another are dispersed in the electrolyte layer 24, the total amount of the EC dyes to be dispersed in the electrolyte layer 24 may be in the above range.

—Redox Agent—

A redox agent, which does not form a color due to a redox reaction (namely, non-color-forming), is preferably dispersed in the electrolyte layer 24 (refer to the redox agent 44 in FIG. 1).

With the use of the redox agent, the redox reaction of the EC dye disposed between the substrates may proceed efficiently, and the reversible color-forming efficiency and color-fading efficiency of the EC dye may be improved.

Further, the redox agent is desirably fixed onto the electrode that is opposite to the electrode on which the porous layer 34, by which the EC1 dye 36 is held, is disposed, of the electrode 28 and the electrode 32. In an exemplary embodiment, as shown in FIG. 1, the porous layer 34, by which the EC1 dye 36 is held, is provided on the electrode 28, of the electrode 28 and the electrode 32, and accordingly, the redox agent 44 is preferably fixed onto the electrode 32. Thus, the redox reaction takes place efficiently simultaneously at the both of the electrode 28 and the electrode 32, so that the overall color-forming efficiency and color-fading efficiency of the display medium 12 can be improved.

Such a redox agent may be any redox agent as long as a color is not formed due to the redox reaction, and specifically, as the redox agent, ferrocene, phenothiazin, and a combination of iodine and metal iodide can be exemplified. In particular, ferrocene is desirable from the viewpoint of a low light absorption coefficient of the solution of ferrocene.

As a method of fixing the redox agent to the surface of the electrode 32, the redox agent may be held on the electrode 32 using a manner similar to the method of holding the EC1 dye 36 in the porous layer 34 as described in the above.

The redox agent to be added to the electrolyte layer 24 is contained in a dissolved state or dispersed state in the electrolyte layer 24, and the concentration of the redox agent in the electrolyte layer 24 is preferably from 0.001 mole/l to 2 mole/l, and more preferably from 0.01 mole/l to 1 mole/l.

—Charge Accumulation Member—

In order to perform efficiently the redox reaction of the EC dyes (EC1 dye 36 and EC2 dye 38) contained between the display substrate 20 and the back substrate 22, a charge accumulation member 42 may be disposed between the substrates, as shown in FIG. 1. The charge accumulation member 42 is desirably fixed onto the electrode that is opposite to the electrode on which the porous layer 34 containing the EC1 dye 36 is provided, of the electrode 28 and the electrode 32. In an exemplary embodiment, the porous layer 34, by which the EC1 dye 36 is held, is provided at the electrode 28, of the electrode 28 and the electrode 32, and accordingly, the charge accumulation member 42 is preferably fixed onto the electrode 32.

As the charge accumulation member 42, a member having a specific surface area of 1,000 or more may be used. As a member having such a large specific surface area, carbon and alumina may be suitably used, and more specifically, activated carbon, carbon nanotube and the like having a large number of pores may be used. Such a member has a large specific surface area, and thus has a large charge capacity to be accumulated, and has a polarity on the surface thereof. Accordingly, by providing the charge accumulation member 42 on the electrode 32 that is opposite to the electrode 28, on which the porous layer 34 containing the EC1 dye 36 is disposed, of the electrode 28 and the electrode 32, the redox reaction efficiently takes place simultaneously on the two electrodes of the electrode 28 and the electrode 32, so that the overall color-forming efficiency and color-fading efficiency of the display medium 12 can be improved.

The display medium 12 constituted as described in the above, can be suitably used in various fields, for example, such as an ECD (electrochromic display); a large-sized display board such as a stock price display; a glare-resistant mirror; a light control element such as and a light-control glass; a low-voltage drive element such as a touch-sensitive panel key switch; an optical switch, an optical memory, an electronic paper and an electronic photo album.

Specifically, the display of a desirable image on the display medium 12 of an exemplary embodiment can be realized by placing the display medium 12 in the display device 10.

For example, as shown in FIG. 1, a display device 10 is configured to include the display medium 12 as described above, a voltage applying section 14 and a control section 16. The voltage applying section 14 is electrically connected to the electrode 28 and the electrode 32. Further, the voltage applying section 14 is also connected to the control section 16 such that signals may be transferred therebetween.

The control section 16 is configured as a microcomputer including a CPU (central processing unit) for controlling overall operations of the device, a RAM (random access memory) for storing various data temporarily and a ROM (read only memory) in which various programs such as a control program for controlling the whole device are stored beforehand.

The voltage applying section 14 is a voltage applying device for applying a voltage to the electrode 28 and the electrode 32, and applies a voltage between the electrode 28 and the electrode 32 in accordance with the control signals from the control section 16.

A desired color can be displayed on the display medium 12 by the control of the control section 16.

Hereinafter, the action in the display medium 12 will be described.

Here, as mentioned above, in the display medium 12, the EC1 dye 36 is held by the porous layer 34, and the EC2 dye 38 is dispersed in the electrolyte layer 24. With respect to the EC1 dye and EC2 dye, the absolute values of the voltages applied between the electrode 28 and the electrode 32 for changing from the color-faded state to the colored state to satisfy the relationship of E1<E2 as Formula (1).

Here, as described in the above, E1 in Formula (1) represents the absolute value of the threshold value of the voltage applied between the pair of the electrodes for changing the EC1 dye 36 held by the porous layer 34 from the color-faded state to the colored state, and E2 represents the absolute value of the threshold value of the voltage applied between the pair of the electrodes for changing the EC1 dye 38 dispersed in the electrolyte layer 24 from the color-faded state to the colored state.

As described in the above, both the EC1 dye 36 and EC2 dye 38 are the reduction dye or both the EC1 dye 36 and EC2 dye 38 are the oxidation dye.

Figure 2:
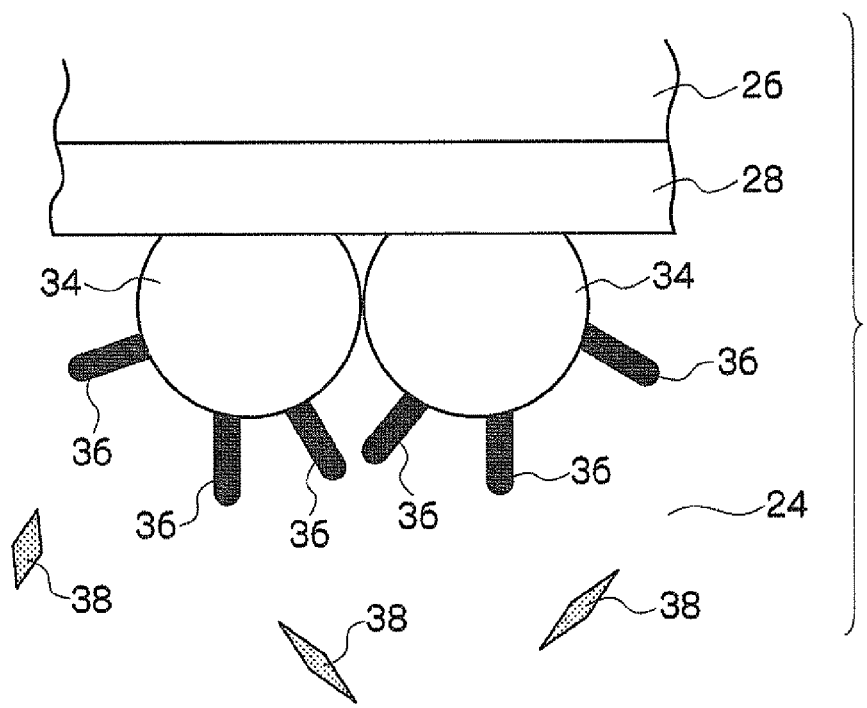
FIG. 2 is a schematic cross-sectional view in which the display substrate side of the display medium is enlarged according to an exemplary embodiment of the invention.
Figure 3:
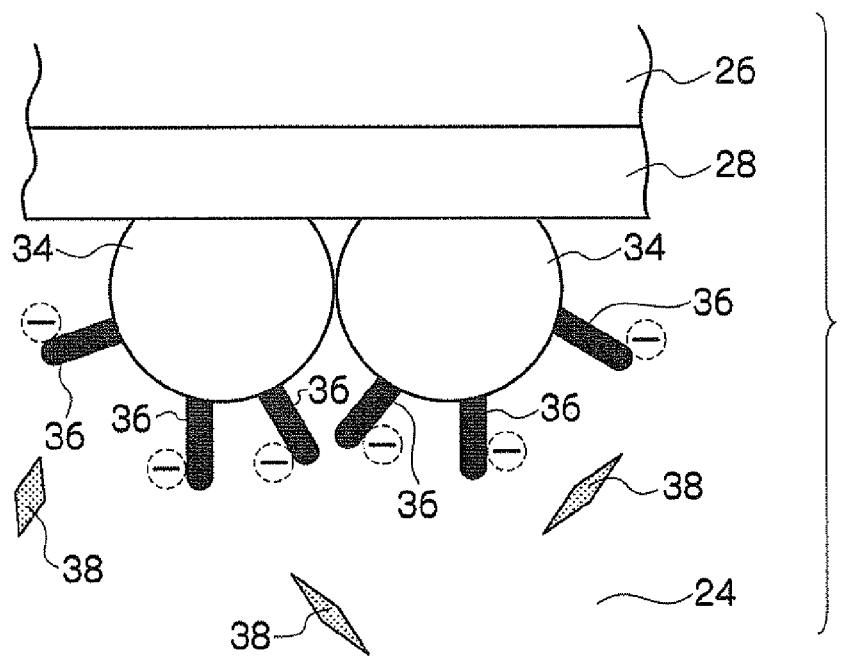
FIG. 3 is a schematic cross-sectional view in which the display substrate side of the display medium is enlarged according to an exemplary embodiment of the invention.

For example, if the both the EC1 dye 36 and EC2 dye 38 each are the reduction dye (which attains the colored state by a reduction reaction, and the color-faded state by an oxidation reaction), and a voltage is applied between the electrode 28 and the electrode 32 such that the electrode 28 becomes a cathode and the electrode 32 becomes the anode, and the applying voltage is gradually raised, and when the voltage of the voltage value E1 which is the threshold value of the EC1 dye 36 is applied, the EC1 dye 36, which has a lower threshold voltage, held by the porous layer 34 provided in contact with the electrode 28 is reduced earlier than the EC2 dye 38, of the EC2 dye 38 and the EC1 dye 36, to change from the non-colored state to the colored state (refer to FIGS. 2 and 3; the denotations in FIGS. 2 and 3 are the same as those in FIG. 1).

Namely, as shown in FIG. 3, when the voltage with the voltage value E1 is applied between the electrode 28 and the electrode 32 as the electrode 28 being the cathode, the EC1 dye 36 is reduced and attains the colored state, but the EC2 dye 38 has not yet been reduced and still in the non-colored state. Accordingly, at this time, only the color of the EC1 dye 36 is selectively displayed on the display medium 12.

Figure 4:
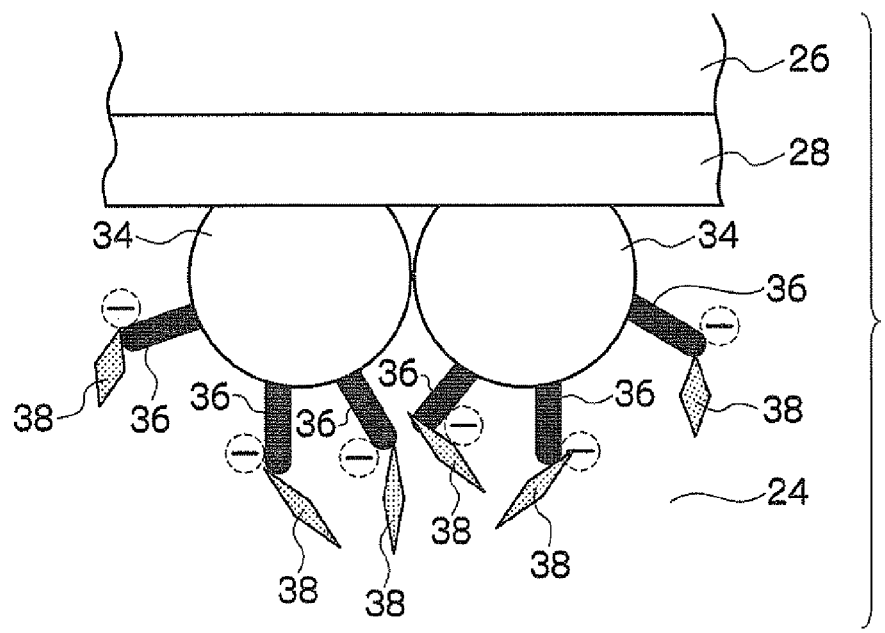
FIG. 4 is a schematic cross-sectional view in which the display substrate side of the display medium is enlarged according to an exemplary embodiment of the invention.

In the process of further increasing the voltage applied between the electrode 28 and the electrode 32, it can be presumed that the EC2 dye 38 dispersed in the electrolyte layer 24 is attracted to the EC1 dye 36 which has generated a radical by being reduced (refer to FIG. 4; the denotations in FIG. 4 are the same as those in FIG. 1).

Figure 5:
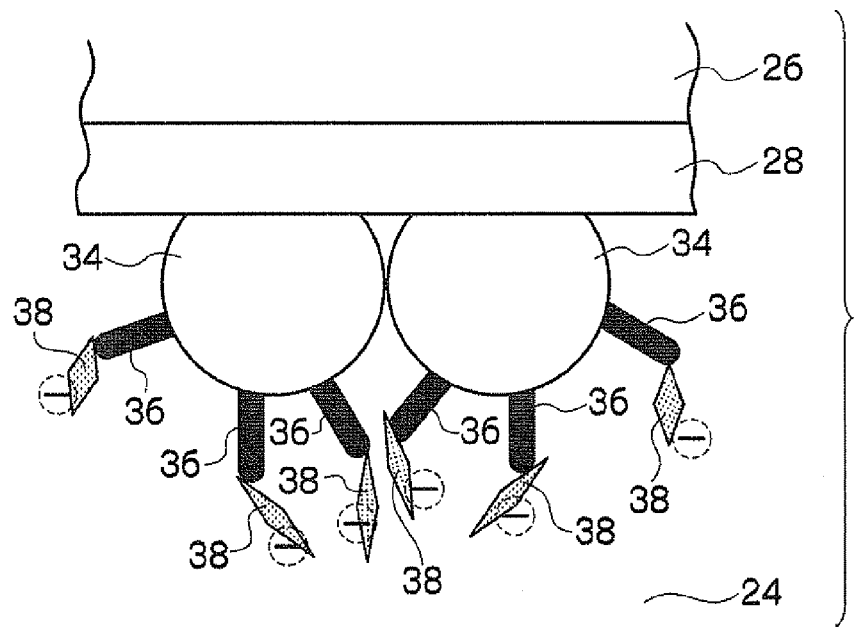
FIG. 5 is a schematic cross-sectional view in which the display substrate side of the display medium is enlarged according to an exemplary embodiment of the invention.

When the voltage applied between the electrode 28 and the electrode 32 is further raised and the voltage of the voltage value E2 which is the threshold value of the EC2 dye 38 is applied, the EC2 dye 38 is reduced to change from the non-colored state to the colored state. At this time, it can be presumed that the transfer of electrons between the molecules from the EC1 dye 36 to the EC2 dye 38 takes place, since the EC2 dye 38 has a higher threshold value than that of the EC1 dye 36, of the EC1 dye 36 and the EC2 dye 38, (refer to FIG. 5; the denotations in FIG. 5 are the same as those in FIG. 1). It can be presumed that by the electron transfer between the EC1 dye 36 and the EC2 dye 38, the EC1 dye 36 held by the porous layer 34 is oxidized to attain the color-faded state, and the EC2 dye 38 is reduced to change from the color-faded state to the colored state. Accordingly, it is presumed that the state in which both the EC1 dye 36 and the EC2 dye 38 are in the colored state simultaneously is prevented from occurring, so that only the EC1 dye 36 becomes the color-faded state, and only the EC2 dye 38 becomes the colored state.

On the other hand, when a voltage is applied between the electrode 28 and the electrode 32 such that the electrode 28 becomes the anode and the electrode 32 becomes the cathode, and the voltage applied to the electrodes is gradually raised, a reverse phenomenon to the above arises.

In detail, when a voltage is applied between the electrode 28 and the electrode 32 such that the electrode 28 becomes the anode and the electrode 32 becomes the cathode, and the voltage applied the electrodes is gradually raised, the EC2 dye 38, of the EC1 dye 36 and the EC2 dye 38, loses electrons due to being oxidized earlier to change from the colored state to the color-faded state. It is considered that the electrons lost from the EC2 dye 38 are received by the EC1 dye 36 due to the electron transfer between the molecules of the EC1 dye 36 and the EC2 dye 38, and the EC1 dye 36 is reduced to change from the color-faded state to the colored state.

Further, it can be presumed that when a voltage is applied between the electrode 28 and the electrode 32 such that the electrode 28 is the anode and the electrode 32 is the cathode, and the voltage applied the electrodes is further gradually raised, the electrons received by the EC1 dye 36 move to the electrode 28, so that the EC1 dye 36 also changes from the colored state to the color-faded state.

Accordingly, it can be presumed that the state in which both the EC1 dye 36 and the EC2 dye 38 are in the colored state simultaneously can be prevented from occurring, so that either the EC1 dye 36 or the EC2 dye 38 becomes the colored state, selectively.

As describe in the above, in the display medium 12 of an exemplary embodiment, the EC1 dye 36 is held by the porous layer 34 disposed so as to be in contact with the electrode 32, of the electrode 28 and the electrodes 32, and the EC2 dye 38 is dispersed in the electrolyte layer 24. The EC1 dye 36 and the EC2 dye 38 form colors different from each other, and satisfy the relationship of the above Formula (1), and further both the dyes are the oxidation dyes or the reduction dyes. In such a constitution, by applying a voltage between the electrode 28 and the electrode 32, and changing the voltage applied and the polarity, only the specific EC dye of the EC1 dye 36 and the EC2 dye 38 is colored selectively in accordance with the polarity of the voltage and the voltage value applied.

Thus, the color mixing between the EC dyes is prevented.

Herein exemplary embodiments of the display medium 12 in which each of the EC dye which is colored in a monochromatic color is used are described. However, as one of the dyes or both the dyes, an EC dye which can form plural different colors in a colored state in accordance with the voltage applied between the electrode 28 and the electrode 32 (an EC dye which can form plural colors in respective colored states in the colored state of the dye) may be used, as long as the absolute values of the threshold value of the voltage applied between the electrodes for changing from a color-faded state to a colored state differ from one another and satisfy the relationship of the above Formula (1), and the colors in the colored state differ from one another. In this case, by adjusting the polarity of voltage and the voltage value applied between the electrode 28 and the electrode 32, further multicolor can be displayed, and the color mixing among colors in the colored state of each EC dye, and the color mixing among plural kinds of colors in the colored state can be prevented, and the aimed colors can be selectively displayed.

For example, suppose that the color of the EC1 dye 36 is different from the color in the colored state of the EC2 dye 38, the relationship of Formula (1) is satisfied, and the EC1 dye 36 forms two kinds of colors different from each other in the colored state, and further, the threshold values of the voltages applied between the electrode 28 and the electrode 32 for changing to each of the two kinds of colors of the EC 1 dye 36 is different from each other. In addition, suppose that the threshold values of the voltages applied between the electrodes for changing to the two kinds of the colors (for example, a first color and a second color) are $E1(A)$ and $E1(B)$ respectively, and the relationship of $E1(A)<E1(B)<E2$ is satisfied.

Furthermore, suppose that the both the EC1 dye 36 and the EC2 dye 38 are the reduction dye. In such a case, for example, when a voltage is applied between the electrode 28 and the electrode 32 such that the electrode 28 is the cathode and the electrode 32 is the anode, and the applied voltage is gradually raised to the voltage of the voltage value $E1(A)$ which is the threshold value of the EC1 dye 36, and the EC1 dye 36, which has a lower threshold voltage, held by the porous layer 34 provided in contact with the electrode 28 is reduced earlier than the EC2 dye 38 (refer to FIG. 3), of the EC2 dye 38 and the EC1 dye 36, to change from a non-colored state to a colored state, the colored state in the first color corresponding to the threshold value $E1(A)$ is formed.

Accordingly, at this time, only the first color of the EC1 Dye 36 is selectively displayed on the display medium 12.

Figure 6:
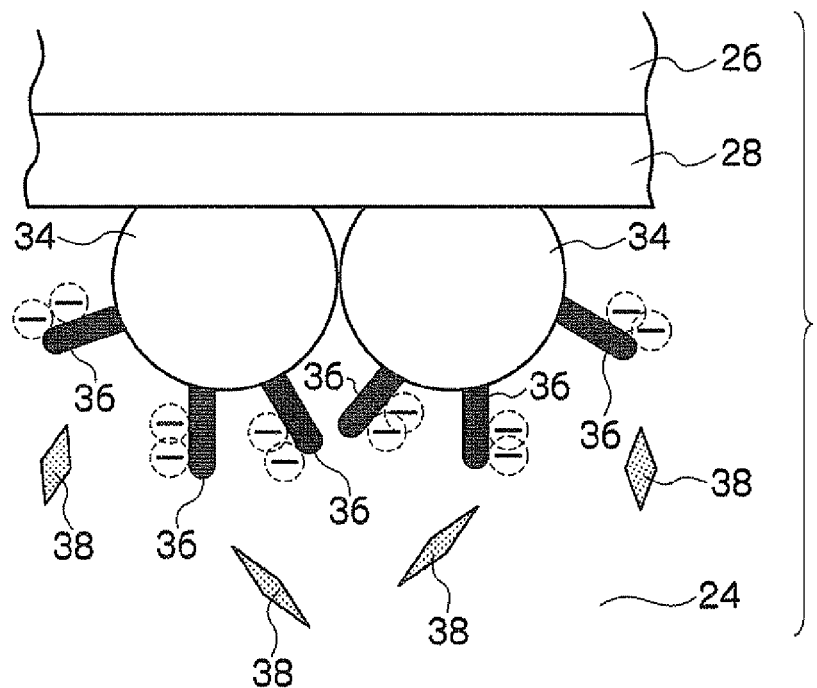
FIG. 6 is a schematic cross-sectional view in which the display substrate side of the display medium is enlarged according to an exemplary embodiment of the invention.

Further, when the voltage of the voltage value $E1(B)$ which is the threshold value for forming a color in the second color of the EC1 dye 36 is applied by raising the voltage gradually, the reduction reaction of the EC1 dye 36 proceeds (refer to FIG. 6; the denotations in FIG. 6 is the same as those in FIG. 1), and the EC1 dye 36 becomes the colored state which is colored in the second color corresponding to the threshold value $E1(B)$.

Accordingly, at this time, only the second color of the EC1 Dye 36 is selectively displayed on the display medium 12.

Figure 7:
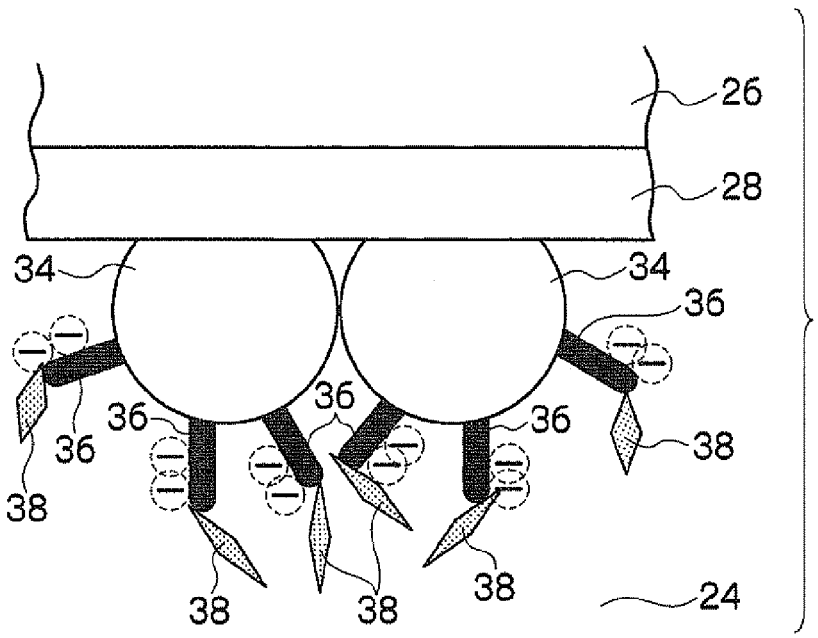
FIG. 7 is a schematic cross-sectional view in which the display substrate side of the display medium is enlarged according to an exemplary embodiment of the invention.

Further, in the process of further increasing the voltage applied between the electrode 28 and the electrode 32, it can be presumed that the BC2 dye 38 dispersed in the electrolyte layer 24 is attracted to the EC1 dye 36 which has generated a radical by being reduced (refer to FIG. 7; the denotations in FIG. 7 are the same as those in FIG. 1).

Figure 8:
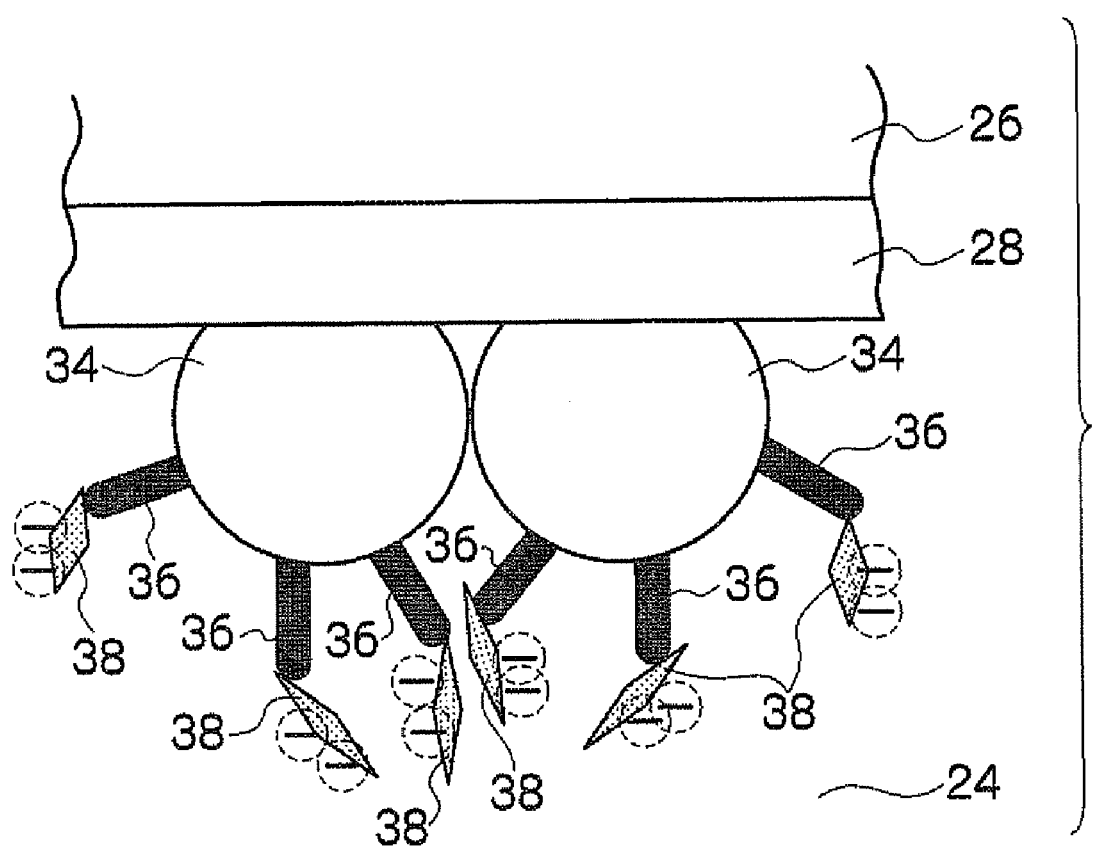
FIG. 8 is a schematic cross-sectional view in which the display substrate side of the display medium is enlarged according to an exemplary embodiment of the invention.

When the voltage applied between the electrode 28 and the electrode 32 is further raised and the voltage of the voltage value E2 which is the threshold value of the EC2 dye 38 is applied, the EC2 dye 38 is reduced to change from a non-colored state to a colored state (refer to FIG. 8; the denotations in FIG. 8 are the same as those in FIG. 1). At this time, it can be presumed that the transfer of the electrons between the molecules from the EC1 dye 36 to the EC2 dye 38 takes place, since the EC2 dye 38 has a higher threshold value than that of the EC1 dye 36, of the EC1 dye 36 and the EC2 dye 38. It can be presumed that by this transfer of the electrons between the molecules, the EC1 dye 36 held by the porous layer 34 is oxidized to form the color-faded state, and the EC2 dye 38 is reduced to change the color from the color-faded state to the colored state. Accordingly it is possible to prevent the state in which both the EC1 dye 36 and the EC2 dye 38 attain the colored state simultaneously from occurring, so that only the EC1 dye 36 becomes the color-faded state, and only the EC2 dye 38 becomes the colored state.

On the other hand, when a voltage is applied between the electrode 28 and the electrode 32 such that the electrode 28 becomes the anode and the electrode 32 becomes the cathode, and the voltage applied to the electrodes is gradually raised, the EC2 dye 38, of the EC1 dye 36 and the EC2 dye 38, loses electrons due to being oxidized earlier to change from the colored state to the color-faded state. It can be considered that the electrons lost from the EC2 dye 38 are received by the EC1 dye 36 due to the electron transfer between the molecules of the EC1 dye 36 and the EC2 dye 38, and the EC1 dye 36 is reduced to change from the color-faded state to the colored state in the first color.

Further, it can be considered that when a voltage is applied between the electrode 28 and the electrode 32 such that the electrode 28 becomes the anode and the electrode 32 becomes the cathode, and the voltage applied to the electrodes is gradually raised, the EC1 dye 36 further receives electrons from the EC2 dye 38, and becomes a colored state in the second color. The voltage applied to the electrodes is further gradually raised, the electrons received by the EC1 dye 36 move to the electrode 28, so that the EC1 dye 36 also changes from the colored state to the color-faded state.

Accordingly, the color mixing among plural kinds of colors in the colored stated of the EC1 dye 36 (the first color and the second color in an exemplary embodiment) and the color in the colored state of the EC2 dye 38 can be prevented, so that the aimed color can be selectively displayed.

In this way, when the EC dye which forms plural kinds of colors in the colored state is used, further multicolor can be displayed as compared with the case where an EC dye which is colored in monochromatic color is used.

In addition, in the above, although the case where only the EC1 dye 36 which forms plural colors in the colored state, of the EC1 dye 36 and the EC2 dye 38, is described, the EC2 dye 38 may be an EC dye which forms plural colors in the colored state.

Although the cases where only two kinds of EC dyes, i.e., the EC dye 36 and the EC2 dye 38, are explained in the above exemplary embodiments, the constitution where additional EC dye(s) are contained may be used.

Figure 9:
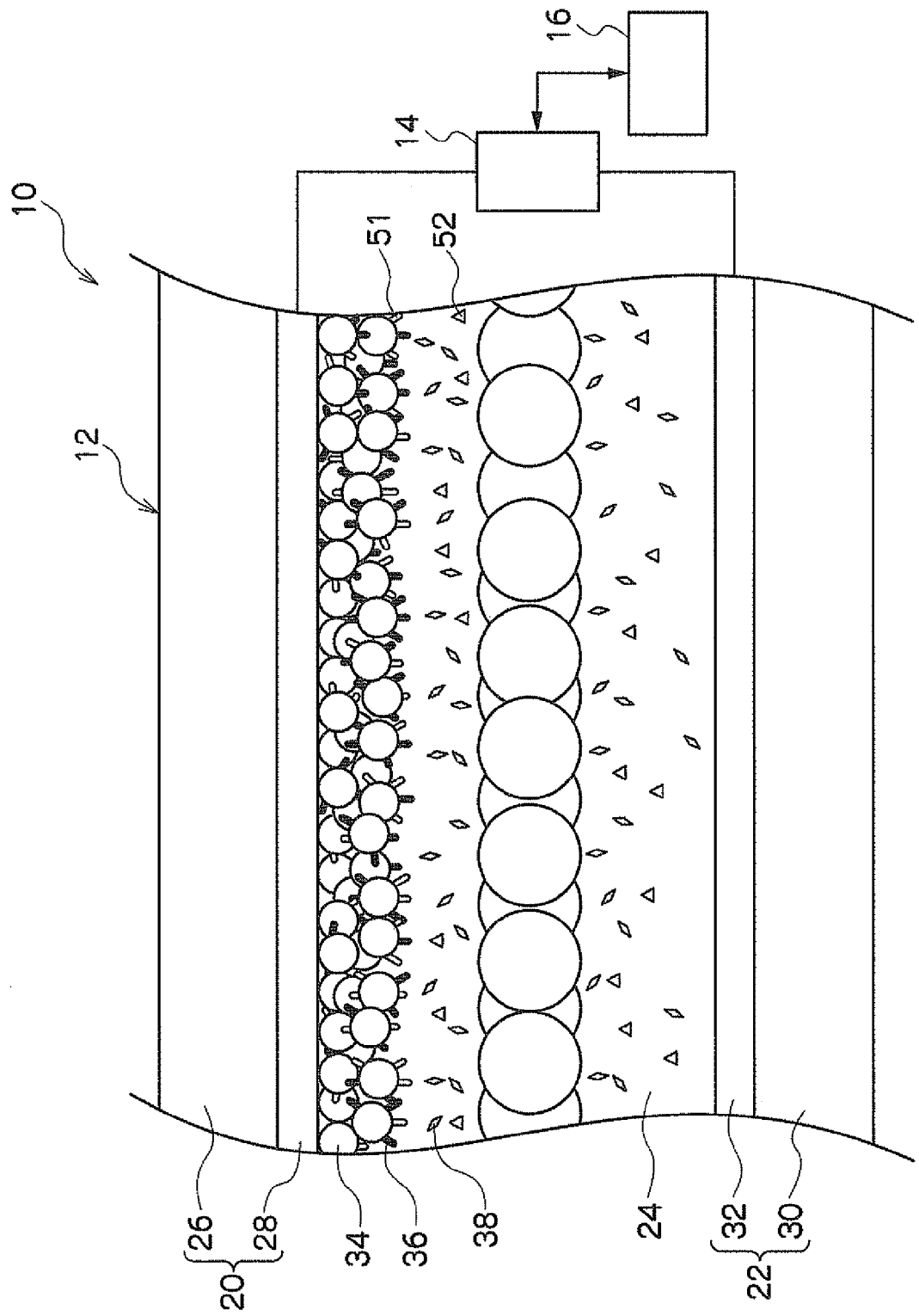
FIG. 9 is a schematic drawing illustrating an exemplary embodiment of a display device different from the display device in FIG. 1.

In an exemplary embodiment, as shown in FIG. 9, a constitution, in which an EC3 dye 51 that forms a color different from those of the EC1 dye 36 and the EC2 dye 38, and an EC4 dye 52 that forms a color different from those of the EC1 dye 36, the EC2 dye 38 and the EC3 dye 51, may be used. In FIG. 9, the other denotations are the same as those in FIG. 1.

The constitution where, of the EC3 dye 51 and the EC4 dye 52, only the EC3 dye 51 is held by the porous layer 34 together with the EC1 dye 36, and the EC4 dye 52 is dispersed in the electrolyte layer 24 together with the EC2 dye 38, may be used. In addition, the method of holding the EC3 dye 51 by the porous layer 34 may be the same as the method of holding the EC1 dye 36 by the porous layer 34.

In an exemplary embodiment the EC3 dye 51 and the EC4 dye 52 are the oxidation dyes when the EC1 dye 36 and the EC2 dye 38 are the reduction dyes, and the EC3 dye 51 and the EC4 dye 52 are the reduction dyes when the EC1 dye 36 and the EC2 dye 38 are the oxidation dyes.

Further, the EC3 dye and the EC4 dye may be selected such that the threshold values of the voltages applied between the electrode 28 and the electrode 32 to change each of the EC3 dye and the EC4 dye from a color-faded state to a colored state satisfy the relationship of the following Formula (2).

$$E3<E4 \quad \text{Formula (2)}$$

In Formula (2), E3 represents the absolute value of the threshold value of the voltage applied between the electrode 28 and the electrode 32 to change the third electrochromic dye from a color-faded state to a colored state, and E4 represents the absolute value of the threshold value of the voltage applied between the electrode 28 and the electrode 32 to change the fourth electrochromic dye from a color-faded state to a colored state.

For example, suppose that the EC1 dye 36 and the EC2 dye 38 are the reduction dyes, and the EC3 dye 51 and the EC4 dye 52 are the oxidation dyes.

In this case, when a voltage is applied between the electrode 28 and the electrode 32 such that the electrode 28 becomes the cathode and the electrode 32 becomes the anode, and the voltage applied to the electrodes is gradually raised, as described in the above, color changes take place such that after the EC1 dye 36 becomes a colored state, the EC1 dye 36 becomes a non-colored state, and at the same time the EC2 dye 38 becomes a colored state.

At this time, since the EC3 dye 51 and the EC4 dye 52 are the oxidation dyes, the EC3 dye 51 and the EC4 dye 52 still maintain the non-colored state.

Meanwhile, when a voltage is applied between the electrode 28 and the electrode 32 such that the electrode 28 becomes the anode and the electrode 32 becomes the cathode, and the voltage applied to the electrodes is gradually raised, the EC1 dye 36 and the EC2 dye 38 as the reduction dyes are maintain the non-colored state, the EC3 dye 51 and the EC4 dye 52 as the oxidation dyes become the colored state and the non-colored state in sequence due to the electron transfer between the molecules in a manner similar to that of the EC1 dye 36 and the EC2 dye 38 as described above, so that the colors in the colored state of each EC dye can be selectively displayed.

In this way, when the EC1 dye 36 and the EC2 dye 38 are the oxidation dye, by containing additional reduction dyes, and when EC1 dye 36 and the EC2 dye 38 are the reduction dye, by containing additional oxidation dyes, furthermore multicolor display can be achieved.

As described in the above, according to the display medium 12 of an exemplary embodiment, in accordance with the threshold value of the EC dye contained between the electrode 28 and the electrode 32 (threshold value of the voltage applied between the electrodes for changing from the color-faded state to the colored state), the voltages with the polarity and the voltage value corresponding to the kinds of the target EC dyes to be changed from the color-faded state to the colored state are applied between the electrode 28 and the electrode 32, from the voltage applying section 14, so that only the color of a specific EC dye, or only the color of a specific colored state of a specific EC dye can be selectively displayed. Thus, the color mixing of the EC dyes can be prevented.

Further, the information of the polarity and the voltage value the voltage of each EC dye to be changed from the color-faded state to the colored state can be beforehand stored in a memory (not shown) of the control section 16 in relation to the information indicating the color to be displayed. The control section 16 may output an instruction signal indicating the application of the voltage with the polarity and the voltage value corresponding to the color to be displayed to the voltage applying section 14. The voltage applying section 14, to which the instruction signal is inputted, may apply the voltage with the polarity and the voltage value corresponding to the instruction signal between the electrode 28 and the electrode 32. In this manner, the desired color of an EC dye, or the color of a specific colored state of a specific EC dye can be displayed on the display medium 12.

In addition, the voltage applied between the electrode 28 and the electrode 32 from the voltage applying section 14, may be a voltage which changes sharply toward the voltage value of the threshold value of each EC dye (for example, voltage changing with a rectangular waveform), but it is desirable to apply the voltage which changes gradually or continuously toward the voltage value of the threshold value.

As described in the above, in the display medium 12 of an exemplary embodiment, the transfer of electrons between the molecules of the EC1 dye 36 (or the EC3 dye 51) held by the porous layer 34 and the EC2 dye 38 (or EC4 dye 52) dispersed in the electrolyte layer 24 is performed, so that one of the EC dyes becomes the color-faded state, while the other becomes the colored state. During the transfer of the electrons, there is a high possibility that the display color is unstable, and therefore, it can be considered that when applying the voltage which changes gradually or continuously toward the voltage value of the threshold value of each dye, the color mixing among EC dyes can be effectively prevented.

Such a voltage application can be realized by the control of the voltage applying section 14 by the control section 16.

EXAMPLES

Hereinafter, the present invention is explained in more detail with reference to the examples. Various changes of materials, use amounts, rates, details of processing, processing procedures and the like may be made without departing from the spirit and the scope of the invention. Accordingly, the scope of the invention is not limited to the following embodiments.

Example 1

The display medium 12 shown in FIG. 1 is produced according to the following operations.

<Preparation of Display Substrate and Back Substrate>

A glass substrates (CORNING1737 (trade name) manufactured by Corning, Inc.) having a thickness of 1.1 mm with an ITO electrode are prepared as a display substrate and a back substrate.

<Preparation of Porous Layer>

A $TiO_2$ porous layer is disposed on the display substrate as a porous layer. More specifically, a $TiO_2$ paste ((Ti-NANOX-IDE HT-LALT: trade name) manufactured by Solaronix) is coated on the ITO electrode of the display substrate at a thickness of 60 μm with the use of a squeegee method, and the coated product is subjected to a heat treatment at a temperature of 130° C. for 30 minutes in the atmosphere so that a porous layer is provided on the ITO electrode of the display substrate. The thickness of the $TiO_2$ porous layer is about 10 μm.

An $SnO_2/Sb$ (antimony-doped tin oxide) layer as a porous layer is disposed on the back substrate. More specifically, water (30% by weight relative to $SnO_2$) and acetylacetone (10% by weight relative to $SnO_2$) are added to $SnO_2/Sb$ powder (particle size of 20 nmφ), and, the pH value of the mixture is adjusted to about 1.7 with hydrochloric acid to obtain a good aqueous dispersion of $SnO_2$. Furthermore, to the aqueous dispersion, PEG20000 in an amount of 40% by weight relative to the amount of $SnO_2$ is added to obtain a paste. The paste is coated on the ITO electrode of the back substrate at a thickness of 60 μm with the use of a squeegee method, and the coated product is subjected to a heat treatment at a temperature of 450° C. for two hours or more in the atmosphere so that a porous layer is provided on the ITO electrode of the back substrate. The thickness of the $SnO_2/Sb$ porous layer is about 8 μm.

<Preparation of Reflective Layer>

As a reflective layer, a polyethylene porous polymer sheet, in which $TiO_2$ particles as a filler are dispersed, is used. The thickness is 31 μm and the reflectance of the sheet itself is 95.8%.

<Adsorption of the EC1 Dye 36 to Porous Layer>

A viologen derivative (reduction dye) represented by the following (I) is prepared as an EC1 dye 36.

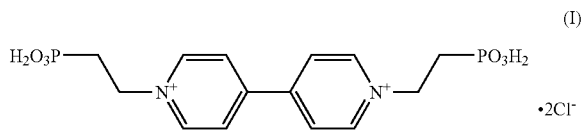

The display substrate with the $TiO_2$ porous layer is immersed in an aqueous solution of 2% by weight of the viologen derivative for 24 hours to adsorb the viologen derivative as an EC1 dye on the $TiO_2$ porous layer. The display substrate with the $TiO_2$ porous layer is subjected to a heat treatment at a temperature of 120° C. for 30 minutes prior to the immersion.

<Preparation of Electrolyte Layer>

As an electrolyte liquid that is used for an electrolyte layer, a solution of tetrabutylammonium perchlorate (TBAP) 50 mM/ferrocene 50 mM/dimethyl sulfoxide (DMSO) is used.

The dimethyl terephthalate (DTP) (reduction dye) represented by the following formula (II) as an EC2 dye 38 is prepared and is dissolved at a concentration of 50 mM in the electrolyte liquid.

Further, ferrocene as a redox agent is dissolved at a concentration of 50 mM in the electrolyte liquid.

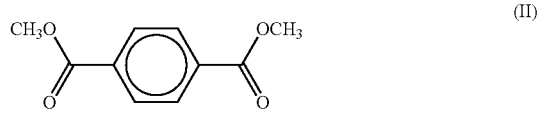

<Production of Display Medium>

The display substrate on which the $TiO_2$ porous layer having the viologen derivative as the EC1 dye 36 adsorbed thereto is provided, and the back substrate on which $SnO_2/Sb$ as a porous layer is provided are disposed so as to face each other with a spacer (TEFLON (registered trademark) sheet) having a thickness of 100 μm between the two substrates. The reflective layer is disposed at an intermediate position between the ITO electrodes within the area (cell) partitioned by the ITO electrode and the spacer, and each cell is filled with the electrolyte liquid, in which the DTP as the EC2 dye and the ferrocene as a redox agent are dispersed. In this way, the display medium as shown in FIG. 1 is prepared.

In the display medium, the threshold value of the voltage required for changing the color from the color-faded state to the colored state of the viologen derivative as an EC1 dye 36 when a voltage is applied between the ITO electrodes is measured, and the viologen derivative is changed from the color-faded state to a blue-colored state at a voltage of −1.5V (the electrode of the display substrate side is the cathode, and the electrode of the back substrate side is the anode), and is changed from the blue-colored state to a yellow-colored state at a voltage of −3.0V.

Similarly, the threshold value of the voltage required for changing the color from the color-faded state to the colored state of the DTP as the EC2 dye when a voltage is applied between the ITO electrodes is measured, and the DTP is changed from the color-faded state to a red-colored state at a voltage of −5.0 V (the electrode of the display substrate side is the cathode, and the electrode of the back substrate side is the anode).

In the display medium containing only one kind of the EC dye, the threshold value is measured in such a manner that a voltage is applied between the ITO electrodes with increasing gradually the voltage from 0 V, and the voltage when the change in color is caused is measured.

In the display medium in Example 1, when the voltage is not applied between the ITO electrodes on the both of the display substrate and the back substrate (0V), a white color of the reflective layer is observed as a whole only with a very slight color attributable to ferrocene.

In this state, a voltage of −1.5V is applied for 10 seconds, subsequently, a voltage of −3.0V is applied for 10 seconds, and thereafter, when a voltage of −5.0V is applied for 15 seconds to the display medium, the color of the display medium 12 is changed to blue, yellow and red, sequentially. Here, the blue and yellow colors are the colors of the colored state of the viologen derivative (colors formed by applying voltages different from one another), and the red color is a color of the colored state of the DTP.

In the voltage applications in this example, the following examples, and the comparative example, the negative voltage application indicates that a voltage is applied to the electrodes in which the ITO electrode at the display substrate side (the substrate where the $TiO_2$ porous layer is provided) is the cathode, and the ITO electrode at the back substrate side is the anode.

Further, the positive voltage application indicates that a voltage is applied to the electrodes in which the ITO electrode at the display substrate side is the anode, and the ITO electrode at the back substrate side is the cathode.

Accordingly, for example, the above "a voltage of −1.5V is applied to the display medium" means that a voltage of 1.5V is applied between the electrodes in which the ITO electrode at the display substrate side is the cathode, and the ITO electrode at the back substrate side is the anode.

In this way, in the display medium, after two colors of the EC1 dye 36 are sequentially formed, the color of the EC2 dye 38 is formed in accordance with the applied voltages. Accordingly, in the display medium, it is confirmed that the color of each EC dye and the colors in the colored state of each EC dye are selectively formed.

Furthermore, the change in the intensity of the RGB reflected lights in the display medium with passage of time when the voltages of −1.5V, −3.0V, and −5.0V are applied is measured using an ultra high-speed digital image sensor CV-3500 ((trade name) manufactured by KEYENCE Corporation). The measurement results are shown in FIGS. 10, 11 and 12.

Figure 10:
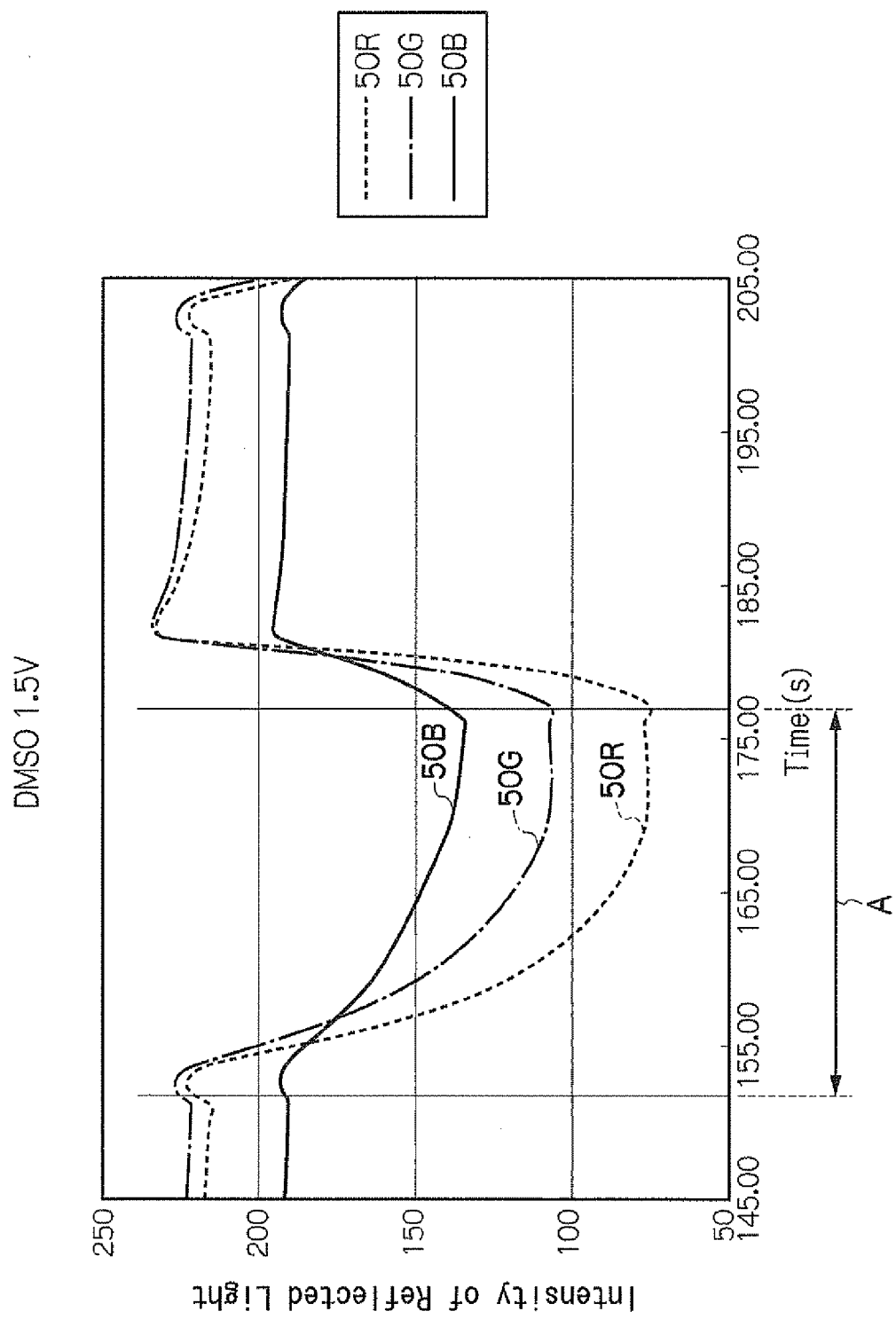
FIG. 10 is a diagrammatic drawing showing the measurement result of the reflective intensity of the display medium in Example 1.

In FIGS. 10-11, the period equivalent to the period A shown in each of the figures is each voltage applied period of the above −1.5V, −3.0V and −5.0V, and the diagram 50R shows the intensity of red reflected light, the diagram 50G shows the intensity of green reflected light and the diagram 50B shows the intensity of blue reflected light.

In FIG. 10, it is shown that the color of the display medium is changed to blue by applying a voltage of −1.5V. Further, in FIG. 11, it is shown that blue color is displayed due to the redox reaction of each EC dye immediately after the voltage application of −2.5V, and thereafter, the color is changed and a yellow color is displayed.

Further, in FIG. 12, it is shown that the color is changed from yellow to red by applying a voltage of −5.0V, and red color is displayed.

In this way, the specific colors of the aimed EC dye and of colored states of the aimed EC dye can be formed by controlling the voltage value and polarity of the voltage applied to the ITO electrodes.

Furthermore, as shown in FIG. 12, it turns out that after yellow color is displayed immediately after applying a voltage of −5.0V, the color is changed to red and is stabilized in the state where red color is displayed. This shows that the electrons are moved from the viologen derivative as the EC1 dye 36 held by the porous layer to the DTP as the EC2 dye 38 dispersed in the electrolyte, so that the DTP is colored with the viologen derivative being rendered color-faded.

Next, when a voltage of +3V is applied for 5 second by inverting the polarity of the applying voltage, it is observed (measured) that the color in the colored state is changed from red to blue through yellow, and further changed to transparent (white). It is considered that this is due to the electrons are returned from the DTP to the electrode via the viologen derivative by applying the voltage of the inverted polarity.

Example 2

A display medium is produced in the same manner as in Example 1 except that the biphenyl diethyl dicarboxylate (BDCD) (reduction dye) represented by the following formula (III) is used in place of the dimethyl terephthalate (DTP) represented by formula (II) used as the EC2 dye 38 in Example 1.

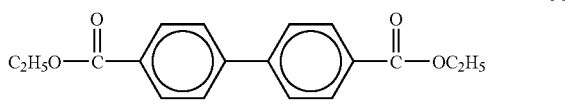

(III)

In the display medium in Example 2, the threshold value of the voltage required for changing the color from the color-faded state to the colored state of the BDCD as the EC2 dye 38 when a voltage is applied between the ITO electrodes is measured, and the DBCD is changed from the color-faded state to a deep yellow-colored state at a voltage of −5.0 V (the electrode of the display substrate side is the cathode, and the electrode of the back substrate side is the anode). The threshold value is measured by the same method as that of Example 1.

In the display medium in Example 2, when the voltage is not applied between the ITO electrodes on the both of the display substrate and the back substrate (0V), a white color of the reflective layer is observed as a whole only with a very slight color attributable to ferrocene.

In this state of the display medium, when a voltage of −1.5V is applied for 10 seconds, subsequently, a voltage of −3.0 V is applied for 10 seconds, and further, a voltage of −5.0 V is applied for 15 seconds, the color of the display medium 12 is changed to blue, yellow and deep yellow, sequentially. Here, the blue and yellow colors are the colors of the colored state of a viologen derivative (colors formed by applying voltages different from one another), and the deep yellow color is the color of the colored state of the BDCD.

In this way, in the display medium, after two colors of the EC1 dye 36 are sequentially formed, the color of the EC2 dye 38 is formed in accordance with the applied voltages. For this reason, in the display medium, it is confirmed that the color of each EC dye and the colors in the colored state of each EC dye are selectively formed.

Example 3

Preparation of Display Substrate and Back Substrate>

As a display substrate and a back substrate, a glass substrate (CORNING1737 (trade name) manufactured by Corning, Inc.) having a thickness of 1.1 mm with an ITO electrode prepared in Example 1 is used.

<Preparation of Porous Layer and Reflective Layer>

A TiO$_2$ porous layer as a porous layer is disposed on the display substrate in the same manner as that of Example 1.

An SnO$_2$/Sb (antimony-doped tin oxide) layer as a porous layer is disposed on the back substrate side in the same manner as that of Example 1.

Further, a reflective layer is prepared in the same manner as that of Example 1.

<Adsorption of EC1 Dye 36 and EC3 Dye 51 to Porous Layer>

The viologen derivative (reduction dye) represented by the above formula (1) as the EC1 dye 36 is prepared. Further, a phenothiazine derivative (oxidation dye) represented by the following formula (IV) as the EC3 dye 51 is prepared.

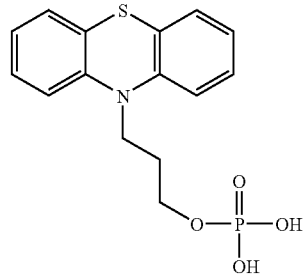

(IV)

The above viologen derivative and the phenothiazine derivative are mixed at a ratio of 1:1 and forming an aqueous solution thereof at a concentration of 2% by weight. The display substrate with the TiO$_2$ porous layer is immersed into the aqueous solution for 24 hours to adsorb both the dyes (the viologen derivative as the EC1 dye 36 and the phenothiazine derivative as the EC3 dye 51) on the TiO$_2$ porous layer.

<Preparation of Electrolyte Layer>

As an electrolyte liquid that is used for an electrolyte layer, the electrolyte liquid prepared in Example 1 is used.

<Production of Display Medium>

The display substrate on which the $TiO_2$ porous layer having both the viologen derivative as the EC1 dye 36 and phenothiazine as the EC3 dye 51 adsorbed thereto is provided and the back substrate on which $SnO_2$/Sb is provided as a porous layer are disposed so as to face each other with a spacer having a thickness of 100 μm from between the two substrates. The reflective layer is disposed at an intermediate position between the ITO electrodes within the area (cell) partitioned by the ITO electrodes and the spacer, and each cell is filled with the electrolyte liquid prepared in Example 1 in which the DTP as the EC2 dye and the ferrocene as the redox agent are dispersed. In this way, a display medium as shown in FIG. 1 is prepared.

In addition, in the display medium, the threshold value of the voltage required for changing the color from the color-faded state to the colored state of the phenothiazine derivative as the EC3 dye 51 when a voltage is applied between the ITO electrodes is measured in the same manner as in Example 1, the color is changed from the color-faded state to a red-colored state at a voltage of +1.2 V.

In the display medium in Example 3, when the voltage is not applied between the ITO electrodes on the both of the display substrate and the back substrate (0V), a white color of the reflective layer is observed as a whole only with a very slight color attributable to ferrocene.

In this state of the display medium, when a voltage of –1.5V is applied for 10 seconds, a voltage of –3.0 V is applied for 10 seconds, and subsequently a voltage of –5.0 V is applied for 15 seconds, the color of the display medium 12 is changed to blue, yellow and red, sequentially. Here, the blue and yellow colors are the colors of the colored state of the viologen derivative (colors formed by applying voltages different from one another), and the red color is a color of the colored state of the DTP.

Next, when the ITO electrode at the display substrate side (the substrate where the $TiO_2$ porous layer is disposed) is set to the anode and the ITO electrode at the back substrate side is set to the cathode, a voltage of +1.2V is applied for 10 seconds, the display medium 12 is colored in red. The red color is a color of the colored state of the phenothiazine derivative.

In this way, in the display medium, after two colors of the EC1 dye 36, which is the reduction dye, are sequentially formed, the color of the EC2 dye 38, which is the reduction dye, is formed in accordance with the applied voltages and the polarity. Further, when a voltage with the inverted polarity is applied, the color of the EC3 dye 51 is formed.

Accordingly, in the display medium, it is confirmed that the color of each EC dye and the colors in the colored state of each EC dye are selectively formed.

Example 4

In the display medium prepared in Example 1, the display medium is prepared in the same manner as that of Example 1 except that the ferrocene as the redox agent in the electrolyte is not added.

In the display medium prepared in Example 4, after a voltage of –1.5V is applied for 10 second, the polarity is inverted and a voltage of +1.5V is applied to the electrodes for 10 second such that the ITO electrode at the display substrate side is the anode. This process is carried out twenty times. Thereafter, a voltage of +1.5V is applied for 10 second to be rendered color-faded, and the densities at ten points including the central point on the entire surface of the display substrate are measured with the use of a densitometer % X-Rite 404A (trade name) manufacture by X-Rite Corporation). When the densities are compared with the densities prior to the voltage application, the ratio of increase is 1.8 times.

Meanwhile, in the display medium prepared in Example 1 similarly, after a voltage of –1.5V is applied for 10 second, the polarity is inverted and a voltage of +1.5V is applied to the electrodes for 10 seconds such that the ITO electrode at the display substrate side is the anode. This process is carried out twenty times. Thereafter, a voltage of +1.5V is applied for 10 second to be rendered color-faded, and the densities at ten points including the central point on the entire surface of the display substrate are measured with the use of a densitometer (X-Rite 404A (trade name) manufacture by X-Rite Corporation). When the densities are compared with the densities prior to the voltage application, the ratio of increase is 1.4 times.

As described above, the reduction of brightness of the display medium prepared in Example 1 containing ferrocene as the redox agent in the electrolyte liquid is small as compared with the display medium prepared in Example 4 without ferrocene as the redox agent in the electrolyte liquid. It can be presumed that this is because the display medium prepared in Example 1 containing the redox agent in the electrolyte liquid has less remained color of the viologen derivative and the redox reaction proceeds effectively as compared with the display medium prepared in Example 4 without the redox agent. Accordingly, it turns out that the introduction of the redox agent may lead to the improvement in display performance of the display medium.

Example 5

In Example 5, a display medium is produced in the same manner as that of Example 1 except that a back substrate having an ITO electrode with the carbon electrode thereon is used in place of the back substrate 22 with $SnO_2$/Sb (antimony-doped tin oxide) as the porous layer prepared in Example 1. The carbon electrode is composed of graphite, and functions effectively as the porous electrode since the carbon surfaces are stacked in layers and the effectual surface area of the electrode is very large.

In detail, the carbon electrode is formed by coating a coating liquid prepared by diluting carbon paste TU-100-5 manufactured by Asahi Chemical Research Laboratory Co., by the factor of two with diluent (#100) manufactured by Asahi Chemical Research Laboratory Co., on the ITO electrode by a squeegee method. The coated product is subjected to a heat treatment at 200° C. for 10 minutes in the atmosphere to form a back substrate with the carbon electrode.

In the display medium prepared in Example 5 after a voltage of –1.5V is applied for 10 second, the polarity is inverted and a voltage of +1.5V is applied to the electrodes for 10 seconds such that the ITO electrode at the display substrate side is the anode. This process is carried out twenty times. Thereafter, a voltage of +1.5V is applied for 10 second to be rendered color-faded, and the densities at the ten points including the central point on the entire surface of the display substrate are measured with the use of a densitometer (X-Rite 404A (trade name) manufacture by X-Rite Corporation). When the densities are compared with the densities prior to the voltage application, the ratio of increase is 1.2 times.

Meanwhile, in the display medium prepared in Example 1, similarly, after a voltage of –1.5V is applied for 10 second, the polarity is inverted and a voltage of +1.5V is applied to the electrodes for 10 second such that the ITO electrode at the display substrate side is the anode. This process is carried out twenty times. Thereafter, a voltage of +1.5V is applied for 10 second to be rendered color-faded, and the densities at the ten points including the central point on the entire surface of the display substrate are measured with the use of a densitometer (X-Rite 404A (trade name) manufacture by X-Rite Corporation). When the densities are compared with the densities prior to the voltage application, the ratio of increase is 1.4 times.

As described above, the reduction of brightness of the display medium having the carbon electrode at the back substrate side prepared in Example 5 is small as compared with the display medium having $SnO_2/Sb$ (antimony-doped tin oxide) at the back substrate side prepared in Example 1. It can be presumed that this is because the display medium having the carbon electrode at the back substrate side prepared in Example 5 has less remained color of the viologen derivative and the redox reaction proceeds effectively as compared with the display medium having $SnO_2/Sb$ (antimony doped tin oxide) at the back substrate side prepared in Example 1.

Accordingly, it is found that the introduction of the carbon electrode to the counter electrode side to the ITO electrode provided with the porous layer holding the EC dye may lead to the improvement in display performance of the display medium.

Example 6

In the display medium prepared in Example 1, a voltage varying in a rectangular waveform as the voltage waveform periodically between −5.0 V and +5.0V is applied between the electrodes. More specifically, after a voltage of −5.0 V is continuously applied for 25 seconds, the polarity is inverted and a voltage of +5.0V is continuously applied for 25 seconds such that the ITO electrode at the display substrate side is the anode. In this way, the application of the voltage varying in the rectangular waveform as a voltage waveform periodically between −5.0 V and +5.0V is repeatedly performed 100 times. In this voltage application, the change in the intensity of the RGB reflected lights at the central portion of the surface of the display medium with passage of time for each second is measured and recorded using an ultra high-speed digital image sensor CV-3500 ((trade name) manufactured by KEY-ENCE Corporation).

Further, in the display medium prepared in Example 1, a voltage varying in a triangular waveform as the voltage waveform periodically between −5.0 V and +5.0V is applied between the electrodes. One period is set to 50 seconds. More specifically, a process, in which the voltage is gradually changed from 0 V toward −5V, and at the time when the voltage reaches −5 V, the polarity is inverted and the voltage is gradually changed toward +5 V to reach +5 V, is repeated 100 times. Thereafter, the change in the intensity of the RGB reflected lights at the central portion of the surface of the display medium with passage of time for each second is measured and recorded using an ultra high-speed digital image sensor CV-3500 ((trade name) manufactured by KEY-ENCE Corporation).

As a result, when the voltage varying in the rectangular waveform is repeatedly applied to the display medium prepared in Example 1, the change in the color-faded state and the colored state cannot be observed due to the application of the rectangular waveform voltage 50 times.

On the other hand, when the voltage varying in the triangular waveform is repeatedly applied to the display medium prepared in Example 1, even if the number of the voltage application exceeds 50 times, the switching of the color-faded state and the colored state in the display medium is favorably performed, and moreover, even if the number exceeds 120 times, any deterioration of display cannot be observed.

For this reason, as a result, when a voltage gradually varying toward the threshold voltage is applied to the display medium, the deterioration of the display can be suppressed as compared with the voltage application where the voltage varies sharply toward the threshold voltage is applied to the display medium.

Comparative Example 1

In Comparative Example 1, a dye described below is used instead of the EC1 dye 36 used in the Example 1.

Further, in Comparative Example 1, as the electrolyte liquid that is used for an electrolyte layer, an electrolyte liquid described below is used in place of the electrolyte liquid used in the Example 1.

Furthermore, although the EC1 dye 36 is adsorbed to the porous layer in Example 1, in Comparative Example 1, the dye is not adsorbed to the porous layer ($TiO_2$ porous layer) used in Example 1.

A display medium is produced in the same manner as in Example 1 except for the above.

More specifically, in place of the viologen derivative represented by the above (1) as the EC1 dye 26, the dye (hereinafter, referred to as the dye (V)) having an ethyl group at the both ends of the viologen derivative is used.

Moreover, as the electrolyte liquid that is used for an electrolyte layer, a solution of tetrabutylammonium perchlorate (TBAP) 50 mM/dimethyl sulfoxide (DMSO) is used (namely. ferrocene used in Example 1 is not contained).

<Production of Display Medium>

The display substrate on which the $TiO_2$ porous layer on which a dye is not adsorbed (same as Example 1 except that the dye is not adsorbed) is provided and the back substrate on which $SnO_2/Sb$ as the porous layer is provided are disposed so as to face each other with a spacer (TEFLON (registered trademark) sheet) having a thickness of 100 μm between the two substrates. The reflective layer is disposed at an intermediate position between the ITO electrodes within the area (cell) partitioned by the ITO electrode and the spacer, and each cell is filled with the DTP prepared in Example 1 and the electrolyte liquid prepared in Comparative Example. In this way, the display medium in which the DTP and the dye (V) are dispersed in the electrolyte liquid is prepared.

In the display medium prepared in Comparative Example 1, the white which is a color of the reflective layer as a whole is observed in the state (0V) where the voltage is not applied between the ITO electrodes at the display substrate side and the back substrate side.

When a voltage of −1.5V is applied to this state of the display medium for 10 seconds, blue color-forming is observed, but even if a voltage of −3.0V for 10 seconds is subsequently applied, any color change is not observed, and the blue color still remains. Furthermore, when a voltage of −5.0V is applied for 15 seconds, purple color-forming is observed.

As described in the above, the blue and yellow colors are the colors attributable to the colored states (colors formed by the application of voltages different from each other) of the viologen derivative and the red color is the color of the colored state of the DTP. Therefore, in Comparative Example 1, a color mixing state of the dyes arises, and selective color-forming of each dye is not observed.

The forgoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium comprising:
 a pair of electrodes disposed with a gap therebetween;
 an electrolyte disposed between the pair of electrodes;
 an electroconductive porous layer disposed at least one of the pair of electrodes, at the side facing the other electrode;
 a first electrochromic dye held by the porous layer;
 a second electrochromic dye movably dispersed in the electrolyte and forming a color different from the color of the first electrochromic dye; wherein
 both the first electrochromic dye and the second electrochromic dye are oxidation dyes which form colors by an electrochemical oxidation reaction and are rendered color-faded by an electrochemical reduction reaction, or reduction dyes which form colors by an electrochemical reduction reaction and are rendered color-faded by an electrochemical reduction reaction, and
 the threshold values of respective voltages applied to the pair of the electrodes to change each of the first electrochromic dye and the second electrochromic dye from a color-faded state to a colored state satisfy the relationship represented by the following Formula (1):

$$E1<E2 \quad \text{Formula (1)}$$

wherein in Formula (1), E1 represents the absolute value of the threshold value of the voltage applied to the pair of the electrodes to change the first electrochromic dye from a color-faded state to a colored state, and E2 represents the absolute value of the threshold value of the voltage applied to the pair of the electrodes to change the second electrochromic dye from a color-faded state to a colored state.

2. The display medium according to claim 1, wherein one of the first electrochromic dye or the second electrochromic dye attains a colored state while the other attains a color-faded state by a redox reaction due to electron transfer between molecules of the first electrochromic dye and the second electrochromic dye.

3. The display medium according to claim 1, wherein the first electrochromic dye forms a plurality of colors in respective colored states, and different threshold values of voltages are applied between the pair of electrodes to form each of the respective plurality of colors.

4. The display medium according to claim 1, wherein the second electrochromic dye forms a plurality of colors in respective colored states, and different threshold values of voltages are applied between the pair of electrodes to form each of the respective plurality of colors.

5. The display medium according to claim 1, further comprising:
 a third electrochromic dye held by the porous layer and forming a color different from those of the first electrochromic dye and the second electrochromic dye and
 a fourth electrochromic dye dispersed in the electrolyte and forming a color different from those of the first electrochromic dye, the second electrochromic dye and the third electrochromic dye, wherein
 when the first electrochromic dye and the second electrochromic dye are reduction dyes, the third electrochromic dye and the fourth electrochromic dye are oxidation dyes, and when the first electrochromic dye and the second electrochromic dye are the oxidation dyes, the third electrochromic dye and the fourth electrochromic dye are reduction dyes, and
 the threshold values of respective voltages applied to the pair of the electrodes to change each of the third electrochromic dye and the fourth electrochromic dye from a color-faded state to a colored state satisfy the relationship represented by the following Formula (2):

$$E3<E4 \quad \text{Formula (2)}$$

wherein in Formula (2), E3 represents the absolute value of the threshold value of the voltage applied to the pair of the electrodes to change the third electrochromic dye from a color-faded state to a colored state, and E4 represents the absolute value of the threshold value of the voltage applied to the pair of the electrodes to change the fourth electrochromic dye from a color-faded state to a colored state.

6. The display medium according to claim 5, wherein one of the third electrochromic dye or the fourth electrochromic dye attains a colored state and the other attains a color-faded state by a redox reaction due to electron transfer between the molecules of the third electrochromic dye and the fourth electrochromic dye.

7. The display medium according to claim 5, wherein the third electrochromic dye forms a plurality of colors in respective colored states, and different threshold values of voltages are applied between the pair of electrodes to form each of the respective plurality of colors.

8. The display medium according to claim 5, wherein the fourth electrochromic dye forms a plurality of colors in respective colored states, and different threshold values of voltages are applied between the pair of electrodes to form each of the respective plurality of colors.

9. The display medium according to claim 1, wherein the electrolyte contains a non-color-forming redox agent.

10. The display medium according to claim 1, wherein a non-color-forming redox agent is held by one electrode of the pair of electrodes on which the porous layer is not provided, such that the side at which the non-color-forming redox agent of the electrode is held faces the other electrode of the pair of the electrodes.

11. The display medium according to claim 1, wherein a charge accumulating member that accumulates an electric charge is provided on one electrode of the pair of electrodes on which the porous layer is not provided, such that the side at which the charge accumulating member of the electrode is provided faces the other electrode of the pair of the electrodes.

12. A display device comprising:
 a voltage applying device that applies a voltage between a pair of electrodes; and
 a display medium which comprises:
 the pair of electrodes disposed with a gap therebetween;
 an electrolyte disposed between the pair of electrodes;
 an electroconductive porous layer disposed at least one of the pair of electrodes, at the side facing the other electrode;
 a first electrochromic dye held by the porous layer; and
 a second electrochromic dye movably dispersed in the electrolyte and forming a color different from the color of the first electrochromic dye; wherein both the first electrochromic dye and the second electrochromic dye are oxidation dyes which form colors by an electrochemical oxidation reaction and are rendered color-faded by an electrochemical reduction reaction, or reduction dyes which form colors by an electrochemical deduction reaction and are rendered color-faded by an electrochemical reduction reaction, and the threshold values of respective voltages applied to the pair of the electrodes to change each of the first electrochromic dye and the second electrochromic dye from a color-faded state to a colored state satisfy the relationship represented by the following Formula (3):

$$E1 < E2 \quad \text{Formula (3)}$$

wherein in Formula (3), E1 represents the absolute value of the threshold value of the voltage applied to the pair of the electrodes to change the first electrochromic dye from a color-faded state to a colored state, and E2 represents the absolute value of the threshold value of the voltage applied to the pair of the electrodes to change the second electrochromic dye from a color-faded state to a colored state.

13. The display device according to claim 12, wherein one of the first electrochromic dye or the second electrochromic dye attains a the colored state while the other attains a color-faded state by a redox reaction due to electron transfer between molecules of the first electrochromic dye and the second electrochromic dye.

14. The display device according to claim 12, further comprising a control device that controls the voltage applying device such that after a voltage is applied between the pair of electrodes in such a manner that the voltage is changed continuously or stepwise toward the threshold value of the voltage applied between the pair of the electrodes to change the first electrochromic dye from a color-faded state to a colored state, a voltage is applied between the pair of electrodes in such a manner that the voltage is changed continuously or stepwise toward the threshold value of the voltage applied between the pair of the electrodes to change the second electrochromic dye from a color-faded state to a colored state.

* * * * *